United States Patent [19]
Aragon

[11] Patent Number: 6,055,327
[45] Date of Patent: Apr. 25, 2000

[54] METHOD OF DETECTING DATA ENTRY ERRORS BY SORTING AMOUNTS AND VERIFYING AMOUNT ORDER

[76] Inventor: David Bradburn Aragon, 1047 Merced St., Berkeley, Calif. 94707

[21] Appl. No.: 08/895,685

[22] Filed: Jul. 17, 1997

[51] Int. Cl.[7] .................................................. G06K 9/00
[52] U.S. Cl. ........................................ 382/138; 382/311
[58] Field of Search .................................. 382/309, 310, 382/311, 137, 138; 705/45

[56] References Cited

U.S. PATENT DOCUMENTS

| | | | |
|---|---|---|---|
| 4,205,780 | 6/1980 | Burns et al. | 235/454 |
| 4,876,731 | 10/1989 | Loris et al. | 382/40 |
| 5,191,525 | 3/1993 | LeBrun et al. | 364/419 |
| 5,193,121 | 3/1993 | Elischer et al. | 382/7 |
| 5,237,158 | 8/1993 | Kern et al. | 235/379 |
| 5,488,671 | 1/1996 | Kern | 382/138 |
| 5,689,579 | 11/1997 | Josephson | 382/137 |

FOREIGN PATENT DOCUMENTS

| | | | |
|---|---|---|---|
| 0 115 189 | 8/1983 | European Pat. Off. | G06K 5/00 |

OTHER PUBLICATIONS

Apr. 1994, Chow, C.K. "Recognition Error and Reject Trade–off", in Proceedings of Third Annual Symposium on Document Analysis, pp. 1–8.

May 1995, RAF Technology Inc. Illuminator User's Manual, Release 0.9 pp. 14 and 54–55.

*Primary Examiner*—Andrew W. Johns

[57] ABSTRACT

An improved method and system for verifying the correctness of data entered from document images. Images are sorted according to their entered values, and are then presented to an adjudication operator, who verifies that the values shown in the images are correctly ordered. Images violating the sorted order are marked for correction. The marking of images is ergonomically advantageous in requiring only a simple pointing device used infrequently. Input can be by voice command. In one preferred embodiment, images are presented in rows and columns upon a video screen, and the operator uses controls similar to the "forward" and "back" buttons of a web browser to navigate through a set of images. In another preferred embodiment, images scroll automatically upwards through an attention zone, within which the operator verifies correct pairwise ordering. The adjudication method can operate with or without information used in previous systems, such as target values, recognition confidence, balancing information, and the like. Variants are described using such information to disambiguate mis-ordered pairs of images; to select images to participate in amount order adjudication; to determine when to accept a second-choice recognition result; and to bypass initial data entry altogether. The method provides for non-intrusive monitoring of its own performance and of the accuracy of the initial data entry module, by measuring results on items whose ordering has been intentionally manipulated.

21 Claims, 15 Drawing Sheets

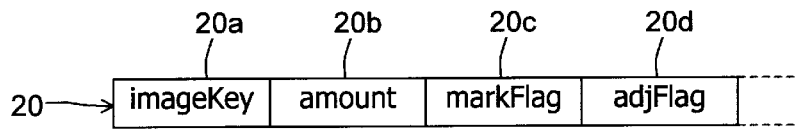
Fig. 5A
20 ⟶ Struct itemRecord {
    ImagePtr     imageKey;    —20a
    DollarAmt    amount;      —20b
    Boolean      markFlag;   —20c
    Boolean      adjFlag;    —20d
    .
    .
};
Fig. 5B
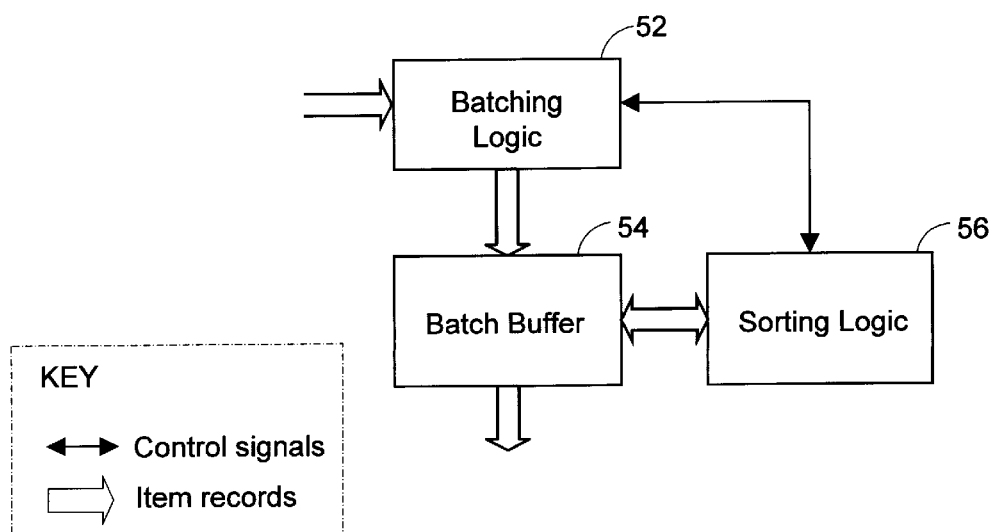
Fig. 6A

| | | |
|---|---|---|
| 26⁰⁰ | 26⁰⁰ | 30.00 |
| 26.65 | 126.15 | 34⁰⁵ |
| 17.50 | 26.65 | 32.59 |
| 27.79 | 27.50 | 36.12 |
| 28.05 | 27.79 | 37.50 |
Fig. 11A     Fig. 11B     Fig. 11C
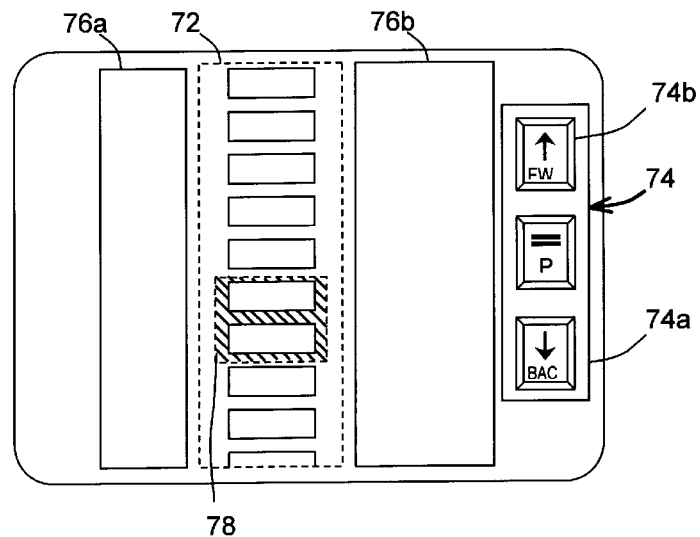
Fig. 12
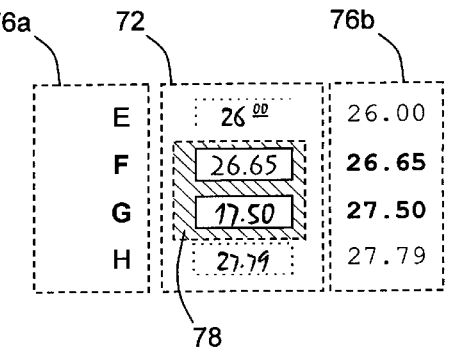
Fig. 12A 06,055,327

METHOD OF DETECTING DATA ENTRY ERRORS BY SORTING AMOUNTS AND VERIFYING AMOUNT ORDER

BACKGROUND—FIELD OF THE INVENTION

This invention relates to reliable data entry in computer systems. More specifically, this invention relates to validation of entered data in document processing systems using electronic imaging. Still more specifically, this invention relates to a system and method for verifying data values read from documents, and for selecting values requiring further inspection or correction, where the values are of a type that can be sorted into an order.

BACKGROUND—PRIOR ART

A general class of document processing systems is typified by U.S. Pat. No. 4,205,780 (Burns). In that ("'780") system, documents are passed through a scanner which both reads the machine-readable data encoded thereon, and creates a video image of the document. The video image is then stored and visually displayed to a key entry operator, who enters values for non-machine-readable written fields, such as the hand-printed courtesy amount on a personal check.

To reduce data entry errors, data values are entered twice, and the first and second entered values are compared for equality. If the first and second entered values fail to agree, the value is entered yet a third time, and so forth until suitable agreement is obtained. Thus, in the basic '780 system every item is entered at least twice and possibly more times, even if the first entered value was correct. Systems of this type nevertheless reduce data entry labor, principally by reducing paper handling, since the data entry from video terminals entails less effort than entry from the original paper documents.

Numerous variants and improvements on the '780 invention have since been created, further reducing the data entry labor. An especially valuable improvement is the use of automatic character recognition. Here we will refer to automatic recognition from images as ICR (to distinguish from "OCR" which, as a term of art in systems of this type refers to optical recognition of a specially encoded line on a document). In a typical ICR recognizer, the document fields to be recognized are first located within the video image, then the field to be read is segmented into individual characters, and finally the characters are recognized. Systems of the '780 type using ICR are described, for example, in U.S. Pat. Nos. 4,876,731 (Loris), 5,193,121 (Elischer), 5,191,525 (LeBran), 5,488,671 (Kern), and European Patent Application no. 83307911.4 (Cain). While substantially reducing data entry at the first keying stage, these systems still require a subsequent correction keying stage, because automatic recognizers are generally no more accurate (and may be substantially less accurate) than the human keyers they replace.

Adjudication Methods in Known Systems

To reduce labor at the correction stage, adjudication rules may be applied whereby some items are selected for acceptance without being entered a second time. These rules generally operate by finding or synthesizing context information for interpreting the value read. Numeric amounts, unlike words, have no inherent context by which an amount may be declared valid or invalid in its own right; accordingly, adjudication rules for amount fields frequently use context information derived from other sources. These other sources are particular to the application. For example, if the application is remittance processing, available context information includes an expected ("target") payment amount. Accordingly, if the value keyed or recognized for a payment check is found to agree with the target amount, the value may be accepted without further verification.

A variant is to find target information in other fields written by the writer of the principal field to be read. For example, if the document is a check and the object is to read the numeric (courtesy) amount, context sources may include the spelled (legal) amount as described for example in Houle et al. If the check is a remittance payment it is accompanied by a remittance coupon, upon which the payment amount may also have been written. As another example, if the document is a credit card sales draft and the field to be read is the total charge amount, then context information may be obtained from such other amounts as the merchandise subtotal, tax, and tip. The use of context information from the same or closely associated documents ordinarily entails the entry or recognition of fields which are not of intrinsic value to the system other than as context targets. Processing these additional fields adds to the cost of the system. Moreover, this method entails the risk of "common-mode error", whereby the same numeral written by the same writer may be misread in the same way each time it appears, so that processing additional fields does not eliminate the error.

Context information may also be derived from groups of related documents. For example, documents may occur in batches, with amounts known to balance to some batch total value, as for example with a bank deposit of several items accompanied by a batch deposit slip. The systems of Elischer and of Cain use the failure of a batch of items to balance correctly as an indication that the items of the batch require correction.

Prior-Art Adjudication Using ICR Confidence

Systems including ICR have additional clues to use in adjudicating a recognized amount. Image-based character recognizers typically produce, in addition to the character value, a confidence value indicating the likelihood that the character has been correctly recognized. Commonly, a threshold value for the confidence is determined empirically for a given application, whereby characters or fields falling below the threshold are selected for manual correction. Because the confidence value imperfectly separates the correct from the incorrect recognition results, the use of a confidence threshold necessarily sends many correct values to correction keying. The relationship between high accuracy (as required in financial applications) and a high rejection rate of valid characters has been analyzed formally (e.g. by Chow) and is an inherent property of the use of the confidence value as an acceptance criterion.

The confidence value may be used in conjunction with context information. In the system of Loris, a feedback path exists from the target value to the recognizer and modifies the recognizer's confidence outputs. In the system of Cain, items falling below a confidence threshold are selected for correction if the batch containing the items fails to balance. The system of Elischer differs from Cain in that the entire batch is sorted by confidence level and keying proceeds in ascending order of confidence, not to a predetermined threshold, but rather until the batch is in balance. The system of Kern examines second-choice (lower confidence) results output by the recognizer and may substitute a second-choice for a first-choice result in some character positions, if doing so will cause the batch to be in balance.

The above systems employ context information in various ways to select a subset of items, which can be accepted without manual re-entry. The use of context information restricts the use of those systems to the particular application types that supply the required context.

An alternative approach, which avoids the use of context information, is to treat the adjudication problem as applying to individual characters rather than to entire amount fields. This approach exploits the fact that ICR recognizers may make errors on only some of the digits in an amount, whereby correction keying need only be performed on some digits and not on entire amounts. In the system of LeBrun, the digits of an amount are displayed to a correction key operator, together with the recognition results and a marker indicating the low-confidence digit(s) to be keyed. While this may offer advantages in some applications, it requires the operator to compare (and thus to shift attention between) the document image and the computer-generated recognition result string containing the marker indicating the single digit to be keyed. Time-and-motion studies have shown that experienced keyers are often faster at entering entire fields than at picking single digits out of a field. Accordingly another method, used by Bankenes Betalingssentral of Norway (BBS), presents to the key operator a synthetic field image composed from the low-confidence digits of several real fields. This method uses essentially no application context and may even combine digits from different types of fields, e.g. amounts, account numbers, and dates. The methods of LeBrun and BBS reduce the correction keystrokes by operating on individual digits rather than entire fields. Nevertheless, they still entail keying of values that in many or most cases were read correctly in the first pass. An additional drawback of digit-based correction methods is that they fail when recognition errors are caused by incorrect segmentation of the field into digits, which is in fact one of the most common types of ICR errors on handwritten amounts. Further, these digit correction methods do not apply to manually entered data, since they require a means of selecting the most suspect digits from a field, and manually entered fields supply no such means.

A context-free verification and correction method has been devised for a different application, namely the proofreading of manually-labeled isolated character images for training adaptive character recognizers. Examples of this method, known in the art as "out of context keying", include the "tagqst" program used to prepare training data for the Mitek Quickstrokes recognizer, and the Illuminator software package developed by RAF Technology under contract to the U.S. Department of Defense. In these systems, the operator views simultaneously several character images all labeled as belonging to the same character class, e.g. the numeral '2'. The operator's task is then to visually verify that the images are in fact all of the same class, and to enter a corrected label for any that appear to belong to another character class, e.g. a numeral '7'. Because the object of these systems is to prepare high quality training data for a recognizer, images which appear ambiguous (for example, due to improper segmentation) may simply be discarded by the operator, an option not present in financial applications. Even so, financial processing systems have recently been offered for sale that include this type of out-of-context verification, an example being "Eyes and Hands" from ReadSoft AB of Sweden. These systems reduce keying labor in the correction stage, because correctly labeled characters can be verified without further keying. However, the method still has the disadvantage described above for digit correction methods generally, in that they handle poorly the case of mis-segmented characters.

OBJECTS OF THE INVENTION

The systems and methods in the above-described prior art lead to usable document processing systems. However, there is still a need for reduction in the labor costs of such systems, and particularly so in data entry keying labor, much of which is redundant in that it entails re-entering values already entered correctly.

It is therefore a broad object of the present invention to provide improved means and methods for entering and validating data in an image-based document processing system.

A more specific object of the present invention is to provide an improved system and method for selecting document image fields for correction, the improvement consisting of a reduction of correction keying labor.

It is a further object of this invention to provide a selection method not requiring application-specific context information.

It is another object of this invention that the selection method not require the reading of any document fields other than those for which values are already required by the system.

It is also an object of this invention to provide a selection method suitable for use with automatic recognition, but requiring neither character segmentation, nor recognition confidence values.

It is additionally an object of this invention that the selection method be compatible with, and be usable and advantageous in conjunction with, other selection methods already devised.

Further objects, advantages and uses of the invention will become evident to those skilled in the art upon reading the following detailed description along with the accompanying drawings, FIGS. 1–16.

BRIEF DESCRIPTION OF THE DRAWINGS

Closely related drawings are given the same number and different alphabetic suffixes.

FIGS. 5(A,B) show the logical layout of an item data record, with FIG. 5A a block diagram and FIG. 5B its equivalent "C" language code;

FIG. 6A is a block diagram of the image sorter;

FIGS. 11A, 11B, and 11C represent examples of sequences of values seen by an operator of the adjudication station;

FIG. 12 illustrates a typical display layout in a second preferred embodiment of the adjudication station;

FIG. 12A shows in greater detail a portion of the display of FIG. 12;

REFERENCE NUMERALS IN DRAWINGS

Like numbers refer to like components throughout the specification.

| | |
|---|---|
| 20 | Data record |
| 20a | First amount field |
| 20b | Second amount field |
| 20c | Adjudication status flag |
| 20d | Mark status flag |
| 22 | Data record containing error |
| 22a, 22b | Amount fields of record 22 |
| 30 | Image capture module |
| 32 | Check |
| 32a | Check courtesy amount |
| 34 | Remittance coupon |
| 34a | OCR target of remittance |
| 34b | Amount-paid field (APF) of remittance |
| 34c | Account number |
| 40 | Initial data entry module |
| 42 | Manual terminal of initial entry module |
| 44 | ICR device |
| 46 | Keyboard |
| 48 | Local area network |
| 50 | Image sorter |
| 52 | Batching logic |
| 54 | Batch buffer |
| 56 | Sorting logic |
| 58 | Database management system |
| 60 | Amount order adjudication station |
| 62 | Video display of adjudication station |
| 64 | Pointing device |
| 72 | Image display zone |
| 74 | Control input zone |
| 74a | Back navigation button |
| 74b | Forward navigation button |
| 76 (a,b) | Auxiliary data display zones |
| 78 | Attention zone |
| 80 | Processor of adjudication station |
| 82 | Input logic |
| 84 | Marking logic |
| 86 | Display controller |
| 88 | System backplane |
| 90 | CPU |
| 92 | Network interface logic |
| 94 | Local area network |
| 96 | Disk storage |
| 98 | Memory |
| 120 | Correction entry module |
| 122 | Manual terminal of correction entry module 120 |
| 124 | Image selection logic |
| 126 | Keyboard of correction terminal |
| 401–406 | Steps in image sorter batching logic |
| 501–504 | Steps in image sorter sorting logic |
| 601–617 | Steps in adjudication processor logic |
| 701–713 | Steps in adjudication operator's procedure |
| 801–824 | Steps in adjudication processor logic (second preferred embodiment) |
| 901–911 | Steps in adjudication operator's procedure (second preferred embodiment) |
| 1001–1004 | Steps in logic using confidence to choose incorrect item(s) |
| 1101–1105 | Steps in logic using confidence for triage before adjudication |
| 1201–1211 | Steps in logic to reduce initial entry |

DETAILED DESCRIPTION

The invention provides an improved adjudication system and method, based on validating the order of a set of sorted items. We will first show a general example showing the principle of operation of the order adjudicator in isolation. Then, additional advantages of the order adjudicator will be illustrated by considering its use within a financial document processing system.

Figure 1:
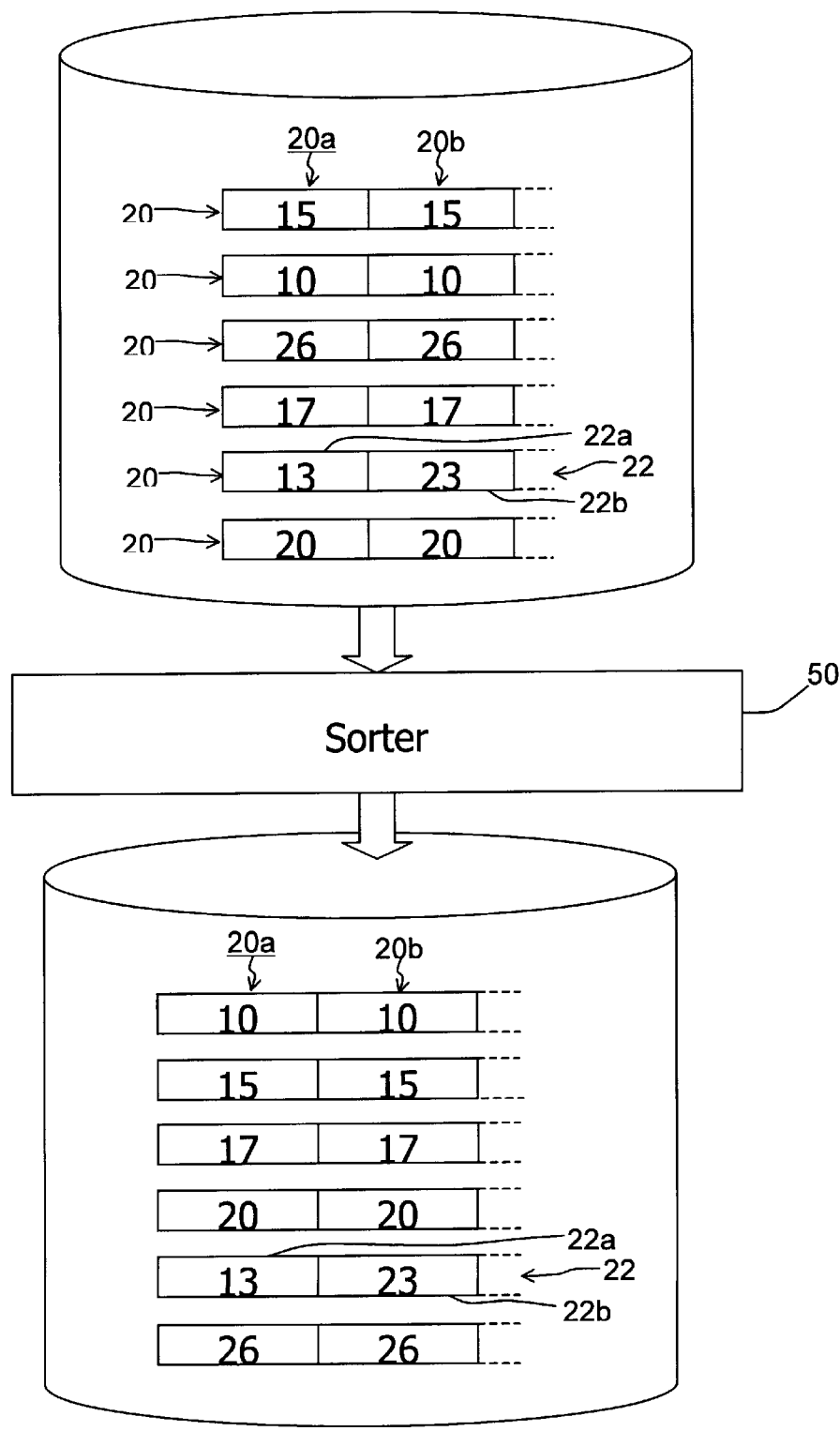
FIG. 1 depicts a fundamental operation of the invention using example data.

Theory of Operation—FIG. 1

FIG. 1 shows a database containing several data records 20. Each of the records 20 has two fields 20a and 20b, which are intended to represent the same value. For example, field 20a might identify an image of a document containing a handwritten amount, while 20b might be a machine-readable transcription of that same amount. However, errors are possible in the transcription. An error is shown in data record 22, where fields 22a and 22b do not represent the same value (the value "23" has been incorrectly transcribed as "13").

Sorter 50 sorts the records 20 according to their second data fields 20b, with the result shown. Visual inspection (adjudication) of the first column shows easily that the ascending order of fields 20a is violated (13 follows 20). However the values are known (by construction) to be in ascending order of their second fields 20b. Therefore, an order violation among fields 20a can only occur if a record's fields 20a and 20b represent different values. This conclusion can be reached without visually comparing the values 20a and 20b, and indeed without visually inspecting the values 20b at all. Further, the error can be localized to one of two records, and a strong conjecture may be made as to the individual erroneous record, again without directly referring to the values 20b. Thus, by using order adjudication, it is possible to detect errors in transcriptions of values without inspecting the transcribed values. This is advantageous not only in that it reduces the number of inspected fields by half, but also in that the fields inspected are now all of the same type, and are thus more amenable to visual comparison.

The greater the number of records 20 that participate in the sorting process, the greater the order violation that will result from an error of a given magnitude. Thus, the efficiency of order adjudication increases with increasing volume of data, which is a highly advantageous quality in high-volume applications such as financial document processing. Also, the greater the magnitude of the error, the greater the order violation. An error can occur, without causing an ordering violation, only if the size of the error is small compared to the average difference between adjacent sorted records. Thus, the error detection provided by order adjudication is increasingly effective with errors of increasing size. This sensitivity is an advantage over conventional methods which, being essentially insensitive to the digit position of an error, are as likely to admit a large error as a small one. The sensitivity of order adjudication is especially an advantage in detecting digit insertion or deletion errors, which affect only a single digit but cause an order-of-magnitude error in the value of the field.

Description of Preferred Embodiment—FIGS. 3–11

Figure 3:
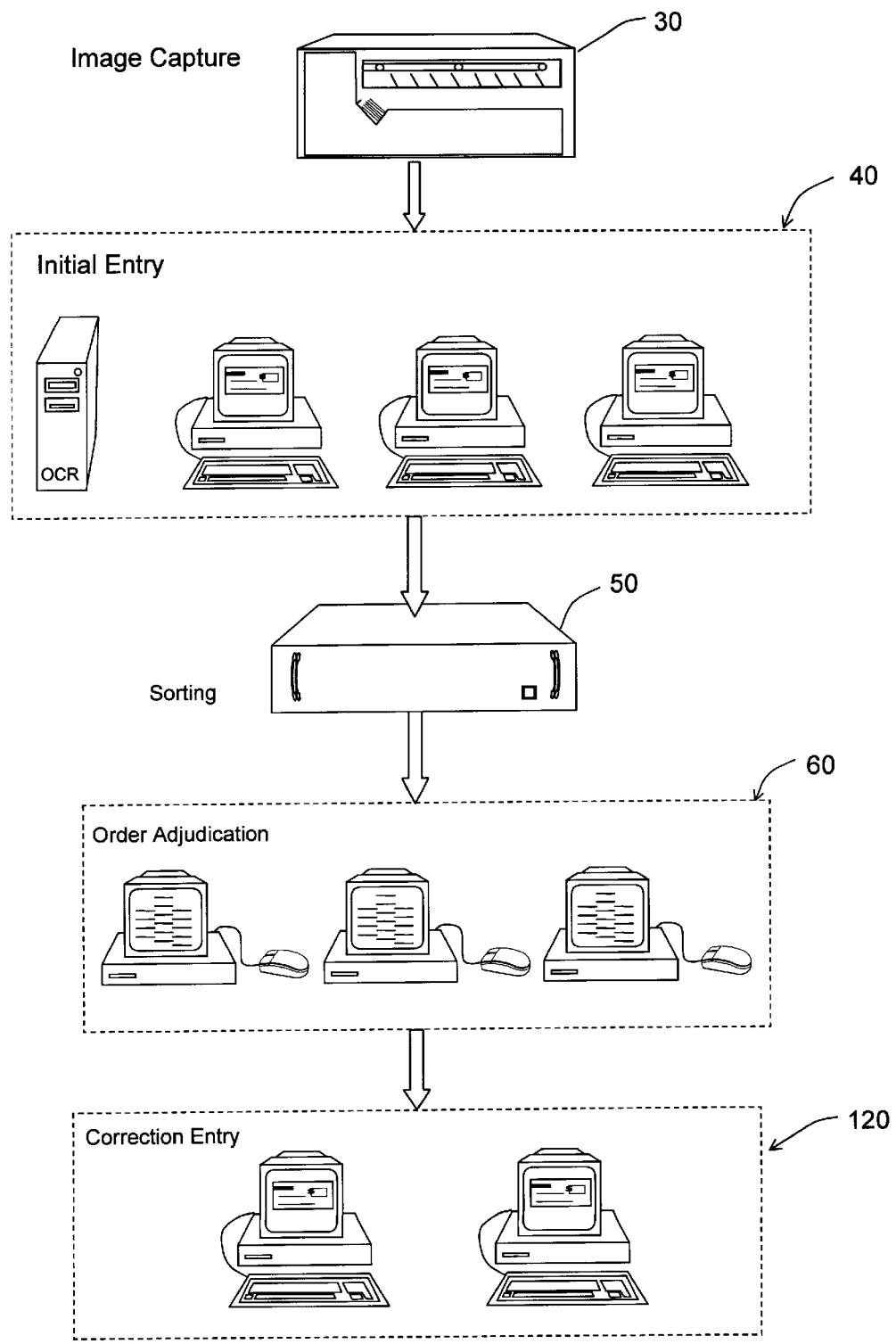
FIG. 3 depicts an overall structure of the preferred embodiment comprising image capture, initial entry, image sorting, order adjudication, and correction entry modules.

To illustrate how the invention may be realized and operated, a financial document processing system of the '780 type will be considered, incorporating amount order adjudication according to the invention. FIG. 3 shows an example of such a system. In this example, the documents to be processed are bank checks, and a primary object of the system is to process each check's courtesy (numeric) amount. Although the invention is advantageous in this exemplary embodiment, this description does not limit the scope of the invention, as the nature of the invention admits of other applications than shown here. The components of the system will be described first in terms of their structure, and then in terms of their operation.

Certain components of a computerized document image processing system, e.g. image storage, workflow control, document encoding, and the like, being entirely conventional, are not shown in the drawing. Those skilled in the art may choose any particular embodiment of such conventional components without departing from the scope of the invention.

Overall System Structure (FIG. 3)

Work flows through the system in the order listed below, via the components shown in FIG. 3:

Image capture module 30, which produces an electronic image of the courtesy amount portion of each check (item) processed by the system;

Initial data entry module 40, which receives these electronic images and, by manual entry and/or ICR, obtains the dollar amount and writes it into a data record or item record associated with the image;

Image sorter 50, which sorts the item records in ascending order of the amounts obtained by initial entry module 40;

Amount order adjudication stations 60, at which operators verify the correct ordering of items and marks those items which, by appearing in incorrect order, are deemed likely to have been entered erroneously in module 40; and Correction entry module 120, where the items marked by adjudication station 60 are given corrected values.

A module or processing stage of a '780-type system conventionally consists of a plurality of units, as shown. For convenience, we will describe individual units, with the understanding that they may be replicated by methods well known in the art.

The system depicted differs from the prior art in the inclusion of image sorter 50 and order adjudication station 60. The other components shown in FIG. 3, though substantially conventional, are affected by the inclusion of the novel components. In particular, the processing load on correction entry module 120 is greatly reduced by the action of adjudication station 60. Accordingly, a large-volume system, incorporating many units of each component, can be made with far fewer correction entry units than would otherwise be required. Other variants of the basic '780 design are also made possible by the effectiveness of the adjudication process, and will be described following the description of the main preferred embodiment.

Image Capture and Initial Entry modules (FIGS. 3–5)

Figure 4A:
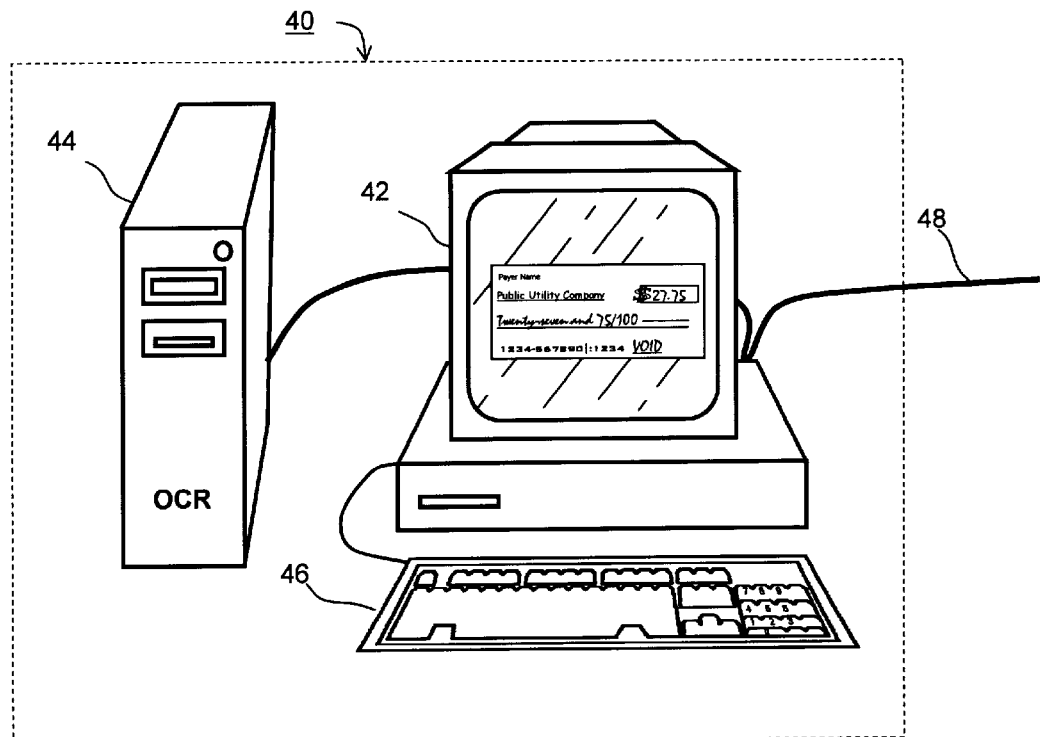
FIGS. 4A and 4B are block diagrams depicting, respectively, the initial entry module and the correction entry module.

Image capture module 30 and initial entry module 40 are conventional, and may be implemented according to any of several means well known in the art (e.g. the '780-type systems). Checks (items) are physically inserted into image capture module 30, which can be an NCR 7780, BTI 91690, or other conventional document scanner. Capture module 30 uses means known in the art to acquire (capture) an image of each check. Capture module 30 delivers these images to initial entry module 40, where the courtesy amount images are isolated and read. Isolation or snipping of courtesy amounts is a known process, and in the case of personal checks is facilitated by the standardized (ANSI) location of the courtesy amount. Initial entry module 40, by reading the courtesy amount images, determines for each image an associated dollar amount. This dollar amount will be referred to as the initial entered value, the word "initial" signifying that it may subsequently be discovered to be in error, and may then be modified. The initial entered value may be derived from manual or automatic (ICR) image recognition or both. FIG. 4A shows an implementation of initial entry module 40 which includes both a manual data entry station 42 using keyboard 46, and an automatic (ICR) recognizer 44. Means of realizing and interconnecting these components are well known in the art (for example, the LeBrun and Elischer patents). FIG. 4A shows a preferred interconnection via local area network 48, which can be Ethernet.

Entry module 40 outputs this initial entered value in a way that allows it to be associated with the check image. Accordingly, for each check image, entry module 40 produces a data structure or database record (hereinafter, "item record"). FIGS. 5(A,B) show an organization of an item record (FIG. 5A is a block diagram and FIG. 5B is an equivalent "C" language structure.) As shown, item record 20 contains:

Image key field 20a identifying the image associated with the item record;

Amount field 20b;

An adjudication status flag 20c showing whether the item has been adjudicated;

A mark status flag 20d showing whether the item has been marked during adjudication.

Image key field 20a is a tag, pointer or address, by which the image of the amount may be retrieved. Using an image key instead of an entire image keeps the item record to a practical size. Amount field 20b is initialized with the initial entered value obtained by module 40. Thus, fields 20a and 20b contain two different representations of the amount on the check, field 20b being a transcription of the image identified by field 20a. The two status flags 20c and 20d are both initialized to FALSE, signifying respectively that the item has not yet been inspected, nor marked, by an adjudication operator.

Image Sorter (FIG. 6A)

Image sorter 50 receives item records 20 from initial entry module 40 and outputs them, sorted by their initial entered values, to amount order adjudication station 60. Image sorter 50 may be implemented by conventional means, the function of sorting data by numeric value being well known in the art. Its operation is nonetheless detailed here because it is an enabling component of the invention.

Sorting is an operation which by nature is performed upon a set of some known number of items. The operation of a high-volume financial document system sometimes entails division of input documents into sets or batches of suitable size for sorting. Alternatively, an entire processing day's input may be considered as one batch. However, the invention allows image capture module 30 and initial entry module 40 to be implemented in a way that does not inherently compose the item records into batches. In that case, image sorter 50 can perform the batching.

FIG. 6A shows an image sorter that buffers the item records into batches and then sorts the batches. Batching logic 52 receives item records (created by initial entry module 40) and places them in batch buffer 54. Sorting logic 56 sorts and outputs the item records in batch buffer 54, in response to a batch-ready signal from batching logic 52. The batch-ready signal may be generated, for example, when the number of records in the batch buffer reaches a predetermined number, or when batching logic 52 detects that there is no more input to be received from initial entry module 40.

Figure 6B:
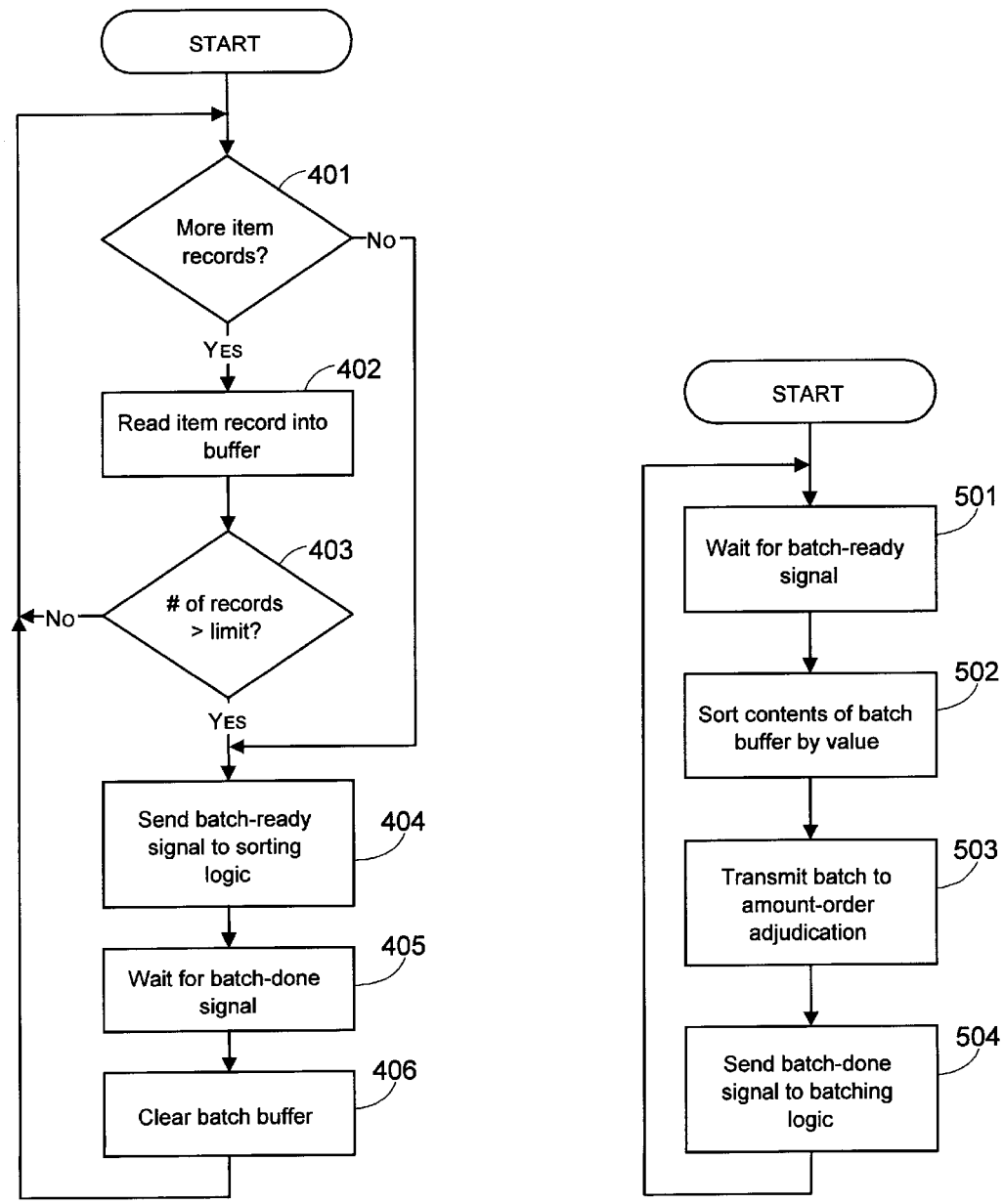
FIG. 6B shows a flow chart representing the operation of the image sorter of FIG. 6A.
Figure 6C:
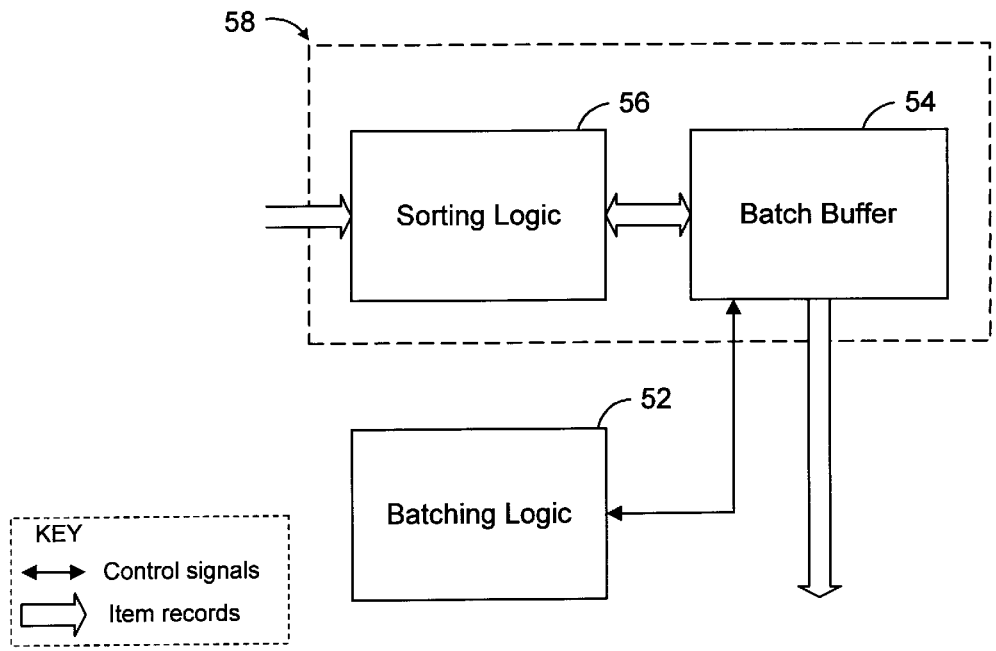
FIG. 6C shows a block diagram of an alternative arrangement of the image sorter.

Second Preferred Embodiment of Image Sorter (FIG. 6C)

FIG. 6C shows an alternative arrangement for connecting batching logic 52, sorting logic 56 and batch buffer 54. In this embodiment, item data records are inserted into buffer 54 in a sorted order. The components of FIG. 6C may be provided by a relational database system 58 employing a conventional B-tree structure, whereby buffer 54 can be a database table and sorting logic 56 can be provided by the database record insertion logic. Accordingly, each insertion of an item into buffer 54 is performed in such a way as to maintain the sorted order of the contents of the buffer. Batching logic 52 operates as in FIG. 6A, i.e., generating a batch-ready signal when the number of database records in buffer 54 reaches a predetermined threshold or when there are no more items to insert. However, in the arrangement of FIG. 6C, the batch-ready signal does not cause sorting to take place, because the records are already in sorted order in the database. Accordingly, the batch-ready signal simply commands the item records to be retrieved from the database, in their sorted order, and transmitted to amount order adjudication station 60.

Figure 7:
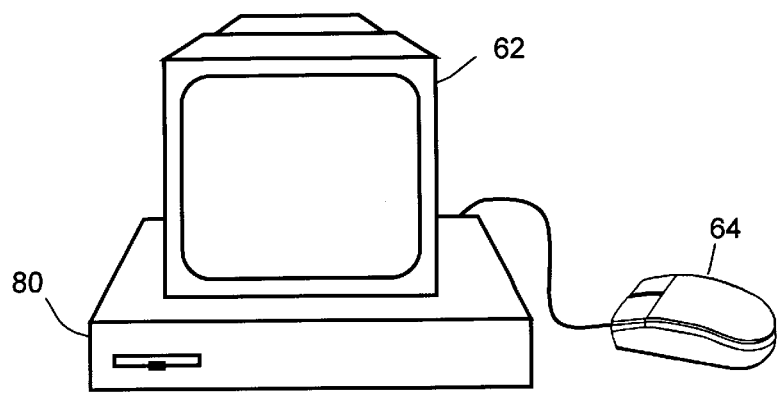
FIG. 7 is a perspective view of a typical embodiment of the amount order adjudication station.
Figure 8:
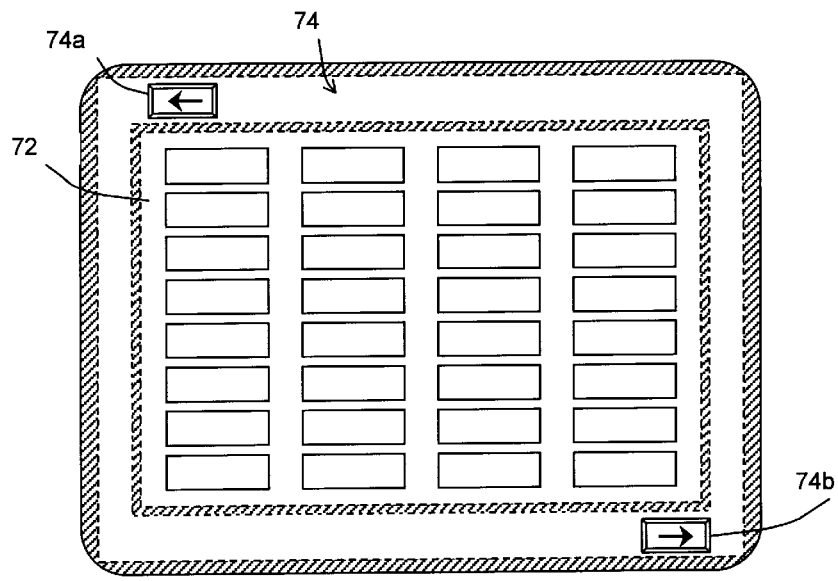
FIG. 8 shows a typical video display of the adjudication station of FIG. 7 in a first preferred embodiment.
Figure 9:
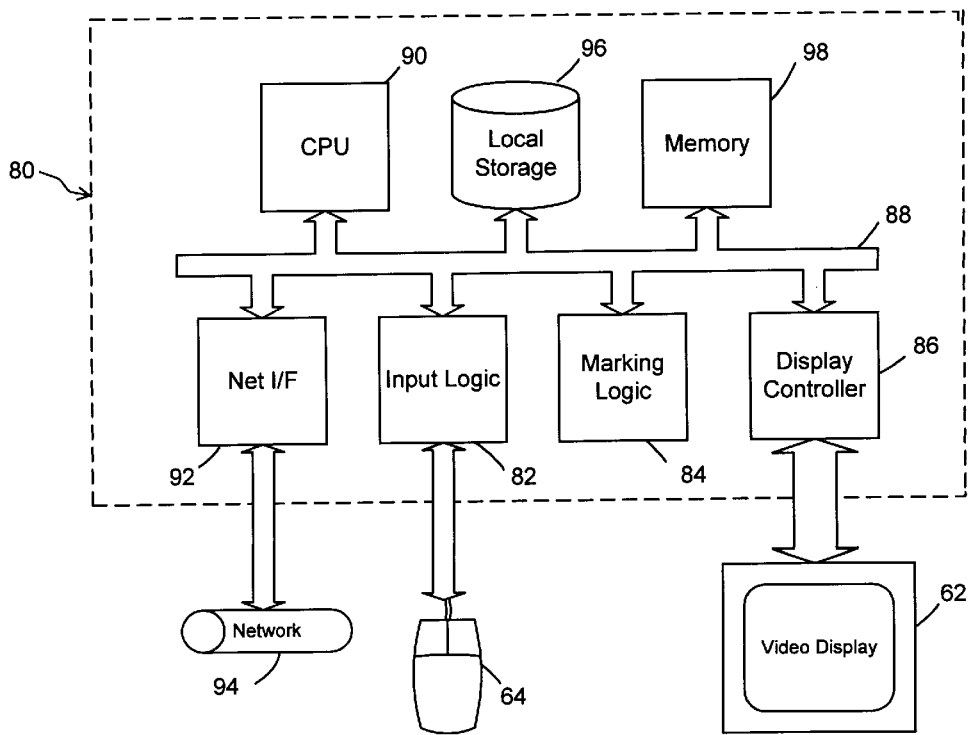
FIG. 9 depicts the functional blocks of the processor of the adjudication station.

Adjudication Station (FIGS. 7–9)

FIG. 7 shows the amount order adjudication station 60, comprising a video display 62 capable of showing several amount images simultaneously; a pointing device 64 by which the operator can indicate items that appear to be ordered incorrectly; and an adjudication processor 80 for controlling the display of images and for accepting and responding to the operator's input.

Video display 62 can be of a conventional type such as would be found on a personal computer. The display resolution will affect the appearance of the invention, by determining the number of amount images that may be simultaneously shown, and thus the amount of visual context available to the operator. For example, an image of a personal check courtesy amount (captured at a conventional resolution of 200 pixels per inch) requires about 100 pixels vertically by 300 pixels horizontally. Therefore, a VGA display of 480×640 pixels can show four or five images in each of two columns, whereas a high-resolution display of 1024×1280 pixels can advantageously display four columns of about ten amount images each. FIG. 8 shows an example screen for display 62 in the first preferred embodiment, with an image display zone 72 presenting item images in rows and columns, and control input zones 74 for operator input to control the display. Control input zones 74 of this preferred embodiment include a "back" button 74a and a "forward" button 74b. These buttons are disposed at the locations where an operator's gaze would fall after scanning backward or forwards through the images in zone 72.

The display is connected and responsive to adjudication processor 80, diagrammed in FIG. 9. This adjudication processor can be of conventional type, e.g. a personal computer with a microprocessor. Processor 80 contains network interface logic 92 for receiving images and amounts from a local area network 94. (Network 94 can be, but need not be, the same network as local area network 48 in FIG. 4A.) Operator input from pointing device 64 enters processor 80 via input logic 82. Processor 80 also contains marking logic 84 for receiving the operator's mark (indication of misordered items) from the input logic and for applying the operator's mark to the item records of the selected items. Display controller 86 is a component within processor 80 for controlling the appearance of images and other display zones of display 62. CPU 90, memory 98, disk storage 96, and interconnecting system backplane 88 are conventional (for example, CPU 90 can be an Intel Pentium). Other ubiquitous components of computers, e.g. power supply, are not shown.

In the preferred embodiment, display controller 86 is a video graphics card, which can be Matrox Millennium, and network interface 92 is an Ethernet interface which can be 3Com. Input logic 82 and marking logic 84 preferably use the general-purpose hardware of processor 80. Pointing device 64 can be any of several known types, such as a mouse, track ball, touch-sensitive screen, stylus, etc. It may even be a microphone, in which case input logic 82 is voice command logic, such as Listen™ for Windows software from Verbex or DragonDictate® software from Dragon Systems, together with an audio interface which can be SoundBlaster®.

Figure 4B:
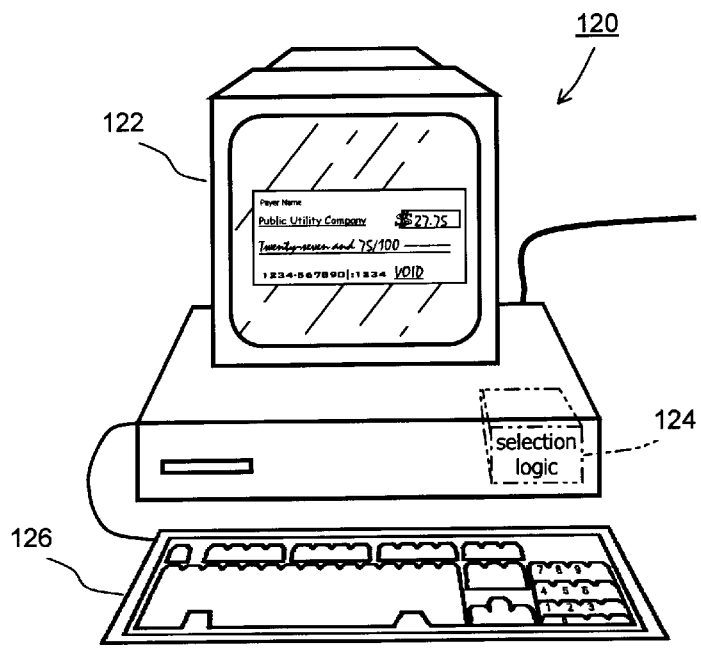

Correction Entry module (FIG. 4B)

Correction entry module 120 in FIG. 4B is a video data entry station of conventional type, as known from the '780-type systems. It may be of essentially the same design and may even use the same hardware as initial entry module 40. We therefore describe it by reference to module 40 in FIG. 4A, and note the relatively minor differences.

First, although apparatus 122 to support manual data entry (cf. 42) is required in module 120, additional apparatus to provide ICR recognition (cf. 44) is less advantageous in correction entry module 120 than in initial entry module 40. In particular, a second ICR of the design same as ICR recognizer 44 will provide no advantage since it will produce the same results. Thus in the preferred embodiment, correction entry module 120 comprises conventional video display and data entry hardware of equivalent capabilities to the manual (non-ICR) portion of initial entry module 40.

Second, module 120 incorporates an input selection rule 126 not present in module 40. Whereas module 40 processes every item of its input and obtains data values for each item, module 120 processes and obtains corrected values for only those items of its input which have been marked as likely to be in error. Rule 126 can be a database select command, requesting to select only those item records 20 which have mark flag 20d equal to TRUE.

Operation—FIGS. 3–11

The overall operation of an image-based financial document processing system is known from (e.g.) the Burns, LeBrun, and Loris patents. The image capture and initial entry modules 30 and 40 operate according to the conventional manner. Thus, item records are created which comprise an image (or more commonly, a key or pointer by which an image may be accessed), together with other information about the image, including the amount entered in initial entry module 40. In some of these item records, the amount will have been entered erroneously due to a recognition or keying error. The function of the remainder of the invention is to detect those erroneous amounts.

Operation of Image Sorter (FIG. 6)

The image sorter shown in FIG. 6A operates in accordance with the flow chart in FIG. 6B. Steps 401 through 406 of the flow chart are executed by batching logic 52, and steps 501 through 504 are executed by sorting logic 56.

In step 401, the presence of unsorted item records 20 is detected. If there are any item records to be processed, execution passes to step 402, which reads a single item record and stores it into batch buffer 54. After the new item record is written, step 403 compares the total number of records in buffer 54 to a predetermined batch size limit. As long as that limit has not been reached, step 401 is re-entered, so that steps 401, 402, and 403 are repeated for each item record received.

The cycle of steps 401 through 403 may be exited in either of two ways. In step 401, the operation of receiving an item record may fail because there are no more item records ready for sorting. Alternatively, in step 403, the predetermined batch size limit may be reached. Either of these events leads to the batch-ready condition, whereby in step 404 the batch-ready signal is sent to sorting logic 56. Control now passes to sorting logic 56. In step 501, the batch-ready signal is detected, leading to step 502 which performs the actual sorting of the item records in batch buffer 54, using the initial entered amounts 20b as the sort key. Sorting being a ubiquitous operation in computer systems, step 502 is not broken down into further detail here, but should be understood to be composed of a sequence of operations which move the various item records until they are in sorted order within batch buffer 54. Completion of step 502 permits the batch of items to be transmitted, in step 503, to the amount order adjudication station. After transmitting the item records from the buffer in step 503, step 504 transmits a batch-done signal to batching logic 52. Control now returns to batching logic 52. In step 405, the batch-done signal is received, permitting execution to continue to step 406, which clears batch buffer 54. The image sorter is now ready to receive the item records of a new batch, and the execution path returns to step 401.

Operation of Amount Order Adjudication Station (FIGS. 7–11)

Figure 10A:
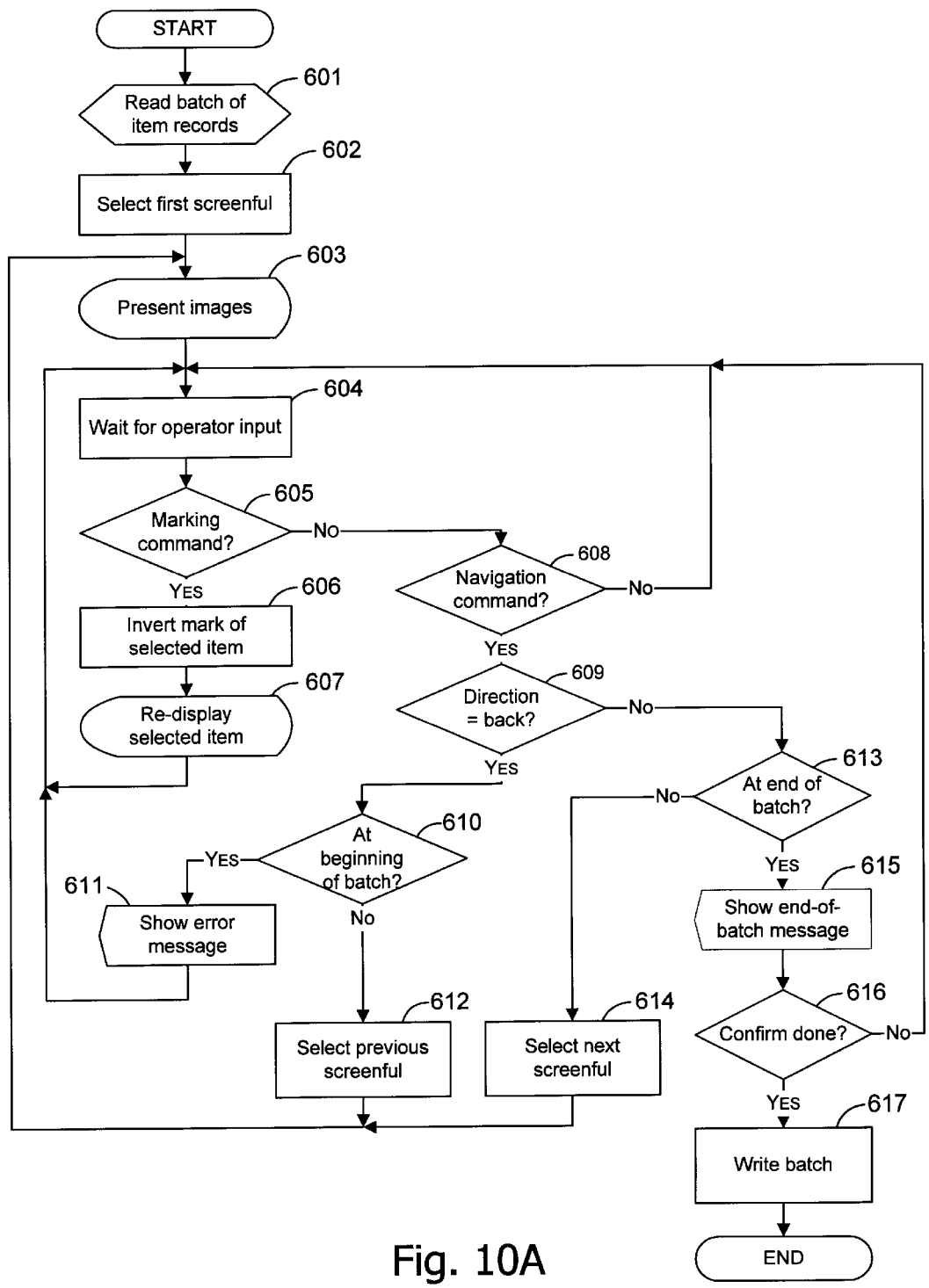
FIG. 10A is a flow chart depicting the control flow of the processor of the adjudication station.

The amount order adjudication station, shown in FIG. 7, displays images and other output to an operator via display 62, and receives operator input via pointing device 64, all under the control of adjudication processor 80. The task of adjudicating or verifying the amount order entails a sequence of steps executed by processor 80, and also a sequence of steps executed by the operator. We will first consider the steps executed by processor 80, as shown in FIG. 10A.

In step 601, a batch of item records is read from image sorter 50. The item records 20 in the batch have at this point been sorted according to their initial entered amounts 20b. The number of items will generally be very much greater than can be simultaneously displayed. Therefore, in step 602, a subset (hereinafter called a screenful) of items is selected, comprising a number of consecutive item records whose images can appear simultaneously within image display zone 72 of display 62. This first screenful of items begins with the first item in the batch (i.e. the item with the smallest initial entered value), and contains subsequent consecutive items from the batch, up to a number sufficient to fill zone 72 with item images.

The selected screenful of images is displayed in step 603. The first item of the screenful (the item with the smallest initial entered value of those in the screenful) is displayed at the upper left position of zone 72. Consecutive items are displayed in a column downward from the first item, until the bottom of zone 72 is reached, and then continue in subsequent columns until zone 72 is filled with item images. Accordingly, the items are arranged on the screen so that a natural visual order in which a person would ordinarily inspect columns of numbers corresponds to the order of initial entered values. A visual highlight indication, which can be reverse video, is used for those items that have received a mark from the operator indicating a possible error. The mark status of an item is determined by reading its mark flag 20d. When first displayed to the operator, an item is not marked, and therefore is displayed normally.

The display control processor now waits, in step 604, for input from the operator. The operator's input is made by using pointing device 64 and consists of selecting an area on the screen. If the selected area is within display zone 72, corresponding to an item image, then the input is a marking command. If the selected area is one of the control input zones 74, then the input is a navigation command. The detection of these input types is made in steps 605 (for marking commands) and 608 (for navigation commands). If the input is not one of these types, control returns to step 604 to await valid input.

Supposing that the input is a marking command, step 606 modifies the item record associated with the selected item. If the item has not previously been marked, a mark with value TRUE is attached to the item. If the item already has a mark, the mark is removed (set to FALSE). Thus, with reference to the item record layout in FIG. 5, a marking command always inverts the previous mark status flag 20d of the item record 20. In step 607, the item's image is re-displayed to show its new mark status; a normal display indicates an unmarked item, whereas a marked item is highlighted (e.g. by reverse video). Control now returns to step 604 to await additional operator input.

Processing Navigation Commands

An alternative path is taken if the input in step 604 is not a marking command but rather is a navigation command. In that case, execution proceeds via step 608 to step 609, which determines the direction of the command. According to the operator's selection of input zones 74 of display 62, the command can be either to move back to the previous screenful, or to move forward to the next screenful within the batch.

Supposing that the command is to move forward, the position of the current screenful within the batch is tested in step 613 to determine whether its last item is the last item of the batch. If it is not, then there are more items available to be displayed, and control passes to step 614, which selects a new screenful of items. The new screenful contains items at consecutively higher positions within the batch than those of the previous screen. To aid the operator in determining the continuity of amount order between the old and new screenfuls, the sequences of items can overlap slightly. For example, the new screenful selected in step 614 may begin with the last item of the old screenful. After the new screenful of items is selected, execution returns to step 603 so that they are displayed.

Considering again the test in step 613, if the currently displayed screenful of items does include the last item in the batch, then no further forward movement in the batch is possible. In this case, the operator may have adequately inspected all the items in the batch. Therefore, control passes to step 615, in which a dialog message is presented to the operator, asking for confirmation that the adjudication of the batch is complete. If the operator indicates in the negative, control returns to step 604 so that the operator may continue to mark and navigate within the batch until satisfied with the adjudication. If the operator indicates in step 616 that adjudication of the batch is complete, then the batch file is written, i.e. made available to subsequent processing stages, in step 617. The batch thus written contains marks (placed by step 606) indicating which of the items in the batch may have erroneous initial entered amounts, and thus require processing by correction entry module 120. Writing the batch also entails setting the adjudication status flag 20c of each item record, signifying that the record has completed adjudication (with or without a mark in flag 20d). Processing of the batch through the amount order adjudication station is now complete.

The path described above, using steps 613 through 616, depends on step 609 finding the navigation command to be a forward or "next screenful" command. We will now consider the case where the navigation command tested in step 609 is a command to move back to a previous screenful within the batch. In that case, execution passes to step 610 where the position of the current screenful within the batch is tested to see whether the screenful includes the first item of the batch. If it does, then no backward movement is possible, and so in step 611 an invalid-input indication (e.g. an audible beep or a visible alert message) is emitted, and control passes to step 604 to await new, valid input. However, if the command to move back is given when the current screenful is not at the beginning of the batch, then the command is valid and control passes to step 612. Step 612 selects a new screenful of items which are at lower positions within the batch than those of the previous screen. As in the case of forward motion within the batch, to aid the operator in determining the continuity of amount order between the old and new screenfuls, the sequences of items may overlap slightly. For example, the screenful selected in step 612 may be selected so that its last item is the same as the first item of the screenful from which the move-back command was given. After the new screenful of items is selected, execution returns to step 603 so that the item images are displayed.

The above description covers the steps performed by the logic of amount order adjudication station 60. We now consider the procedure followed by an adjudication operator.

Operator's Use of Adjudication Station

Figure 10B:
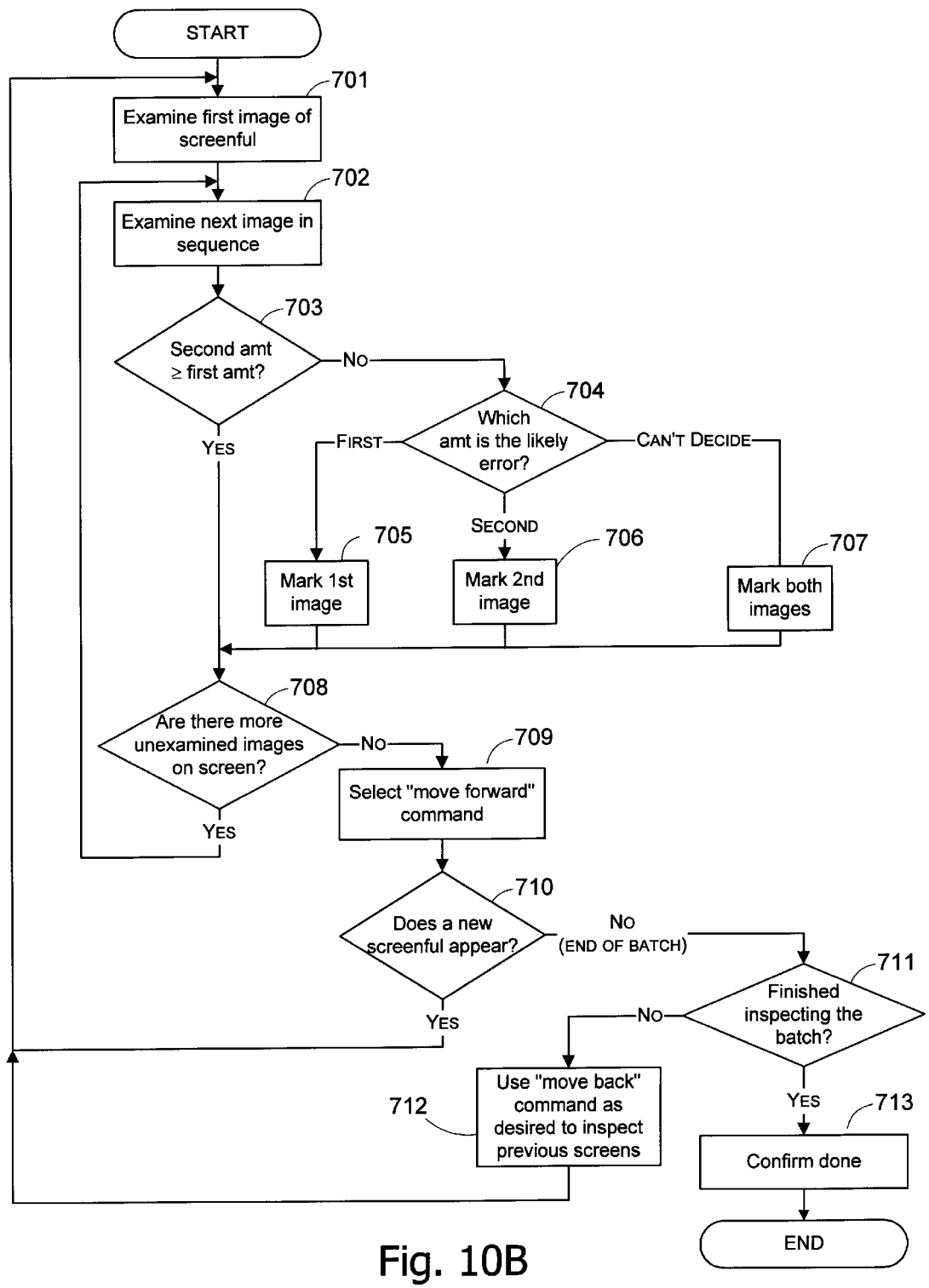
FIG. 10B is a flow chart depicting the actions of an operator of the adjudication station.

FIG. 10B is a flow chart of possible actions by an operator adjudicating a batch of items. In practice, humans exercising judgment often do not follow a precise sequence of steps. Therefore, while FIG. 10B exemplifies a possible sequence of steps followed by an operator, it should not be considered as defining the only mode in which one might successfully operate the adjudication station.

The basic role of the operator is to mark, using pointing device 64, those items which appear to be in error. As noted above, the action of pointing device 64 toggles or inverts the state of the mark on any selected item, and pointing device 64 can also produce commands to navigate forward or backward within a batch. Thus, it will be appreciated that the operator can make or remove marks from any items of a batch, until all and only those items are marked which the operator considers likely to be in error. The operator's procedure therefore is directed at discovering and marking the erroneous items in an efficient manner.

The sequence begins when a batch becomes available for adjudication, at which time video display 62 shows a screenful of item images. The operator's first step 701 is to examine the first item image of the first screenful.

In step 702, the operator examines the next image in sequence. There are now two images within the operator's scope of attention. In step 703, the operator decides whether the amount depicted in the second (most recently examined) image is at least as great as the amount depicted in the first (i.e. previously examined) image. Ordinarily this relation of the two values will be found to hold true, because the initial entered values will be predominantly correct and the images are in ascending order of those values. In that case, the procedure returns to step 702 and the operator examines a third image which is then compared in step 703 with the second image. Thus, the operator continues to visually scan the item images on the screen, verifying that each depicts an amount at least as great as its predecessor.

If the operator decides in step 703 that the order of the two images under consideration is incorrect, then the procedure branches to step 704, in which the operator judges which of the two values is likely to be incorrect. Again, in practice this judgment might not entail a linear sequence of steps, but FIGS. 11 (A,B,C) show examples which demonstrate the manner in which a human operator may use visual and numeric context to decide which values are likely erroneous. In FIG. 11A, the sequence of values (26.00, 26.65, 17.50, 27.79, 28.05) contains a visible mis-ordering because the value 17.50 is smaller than its predecessor 26.65. Of the two values of the mis-ordered pair (26.65, 17.50), the second value (17.50) is likely erroneous because it is smaller than either of the two preceding values. Further, its removal would leave the remaining values in its neighborhood in the correct order. On the other hand, the first (26.65) of the two error candidates would be a plausible member of the sequence of preceding and following values, were the value 17.50 to be removed or corrected. Therefore, the operator can discern that the likely cause of the violation of numeric order is a mistaken entry of the value 17.50 as some other value. (In this example, it may be that the correct value 17.50 was mis-entered as 27.50, leading to its incorrect position in the sequence. However, the operator need not know this in order to determine which value of the misordered pair is the likely culprit.)

Next, we consider the example in FIG. 11B, in which part of the screenful visible to the operator shows the sequence (26.00, 126.15, 26.65, 27.50, 27.79). The ascending numeric order is violated by the pair of values (126.15, 26.65). The cause is evidently the first value (126.15) of the pair, because it is greater than any of the several following values. This type of error would be caused, for example, by an ICR recognizer failing to distinguish a leading '1' from the edge of the bounding box of the courtesy amount region of a check, whereby the correct amount 126.15 is mis-recognized as 26.15. Errors of this type sometimes occur when a remittance customer goes on vacation and, anticipating the arrival of bills during the customer's absence, pre-pays an extra hundred dollars against the current bill (which is $26.65 in this example). Conventional processing rules will fail to detect the ICR error, because the amount reported by the ICR device is highly plausible, being precisely the amount of the current bill. The error is easily detected, however, by an operator using amount order adjudication station 60, because the extra digit causes the erroneous amount to stand out clearly from its neighbors on the display.

FIG. 11C shows a sequence (30.00, 34.05, 32.59, 36.12, 37.50) in which the pair (34.05, 32.59) violates the ascending numeric order. In this case there is insufficient information to decide whether the error is in the first, the second, or in both of the items of that pair. In such cases, the operator is to assume that both items require correction.

Marking the Chosen Item(s)

Returning now to the flow chart of FIG. 10B, we see that the operator has sufficient visual and numeric context to make the decision in step 704. If the mis-ordering can be attributed to one or the other of the mis-ordered items, then the action taken is either step 705 or step 706, according as the error is attributed to the first or the second item of the mis-ordered pair. These steps entail using the pointing device to mark the item to which the error is attributed. If the operator cannot quickly and confidently decide to mark only one of the two items, then the correct action is step 707, which marks both items. After the marking action of step 705, 706, or 707, the operator resumes scanning the display, and arrives at step 708. If the display then contains additional images to be examined, the procedure returns to step 702, and steps 702 through 708 are repeated.

Eventually the last item image of the screenful is examined. Then, step 708 leads to step 709, in which the operator uses pointing device 64 to select the forward or "next screen" navigation command. If there are items yet to be examined in the batch, a new screenful of items will be presented. (Referring to FIG. 10A, processor 80 is now executing its steps 614 and then 603.) The operator, noting in step 710 that a new screenful appears, proceeds to examine the new screenful by returning to step 701 and repeating the procedure of steps 701 through 710. Eventually the last screenful of the batch is examined, and the operator observes in step 710 that instead of a new screenful of item images, the display shows a message or dialog box requesting confirmation that adjudication of the batch is complete. The operator decides in step 711 how to respond to this request. An operator who is confident that the batch has been correctly adjudicated proceeds to step 713, and confirms that inspection of the batch is finished. An alternative outcome of the decision in step 711 is that the operator is not confident that the batch has been correctly adjudicated, and wishes to review some of the items of the batch before declaring the inspection complete. In that case, the procedure leads to step 712. Recall that the operator has means, via control input zones 74, to give commands to navigate backward or forward within the batch. Accordingly, step 712 should be understood to be composed of any sequence of backward and forward navigation commands which cause the display to show such items within the batch as the operator may wish to review. Once navigation to the desired position is achieved in step 712, the procedure resumes at step 701. Steps 701 through 712 are thus repeated as many times as desired, until the operator is satisfied with the quality of adjudication of the batch and chooses the path from step 711 through step 713.

Operation of Correction Entry Module (FIG. 4B)

As noted in its structural description above, correction entry module 120 is of conventional design as commonly found in image-based data entry systems. Accordingly, its operation is conventional: item images are displayed on a video monitor, and their associated numeric amounts are entered by a human operator. Thus, the operation of data entry station 122 of module 120 is essentially similar to the operation of data entry station 42 of initial entry module 40. It may be advantageous, however, for the owner of the system to apply different staffing rules to module 120 than to module 40, for the following reason. Owing to the action of input selection rule 126, module 120 displays and corrects only those items deemed likely to have been entered erroneously in module 40. Accordingly, the values presented for correction presumably have a greater than average propensity to be entered in error. Therefore, the operators of correction entry module 120 may be different operators, of a higher skill level, than those of initial entry module 40. If operator performance is monitored by the employer, the performance targets for operators of module 120 may be adjusted to place greater emphasis on accuracy and less emphasis on speed, relative to the targets for operators of module 40. This difference reflects, on the one hand, the need for greatest accuracy in the processing stage furtest along the processing stream. It reflects, on the other hand, the fact that volume of work is far lower in module 120 than in module 40, so that greater time and care can be taken with each item, while maintaining overall system throughput and reasonable labor cost.

Description of Second Preferred Embodiment—FIGS. 12, 13

FIG. 12 illustrates a second preferred embodiment of video display 62, with image display zone 72 having a single column, within which a subset of the displayed items (preferably two) are highlighted in a "hot zone" or attention zone 78. In this second preferred embodiment, additional screen space to the right and/or left of zone 72 may be used for auxiliary data display zones 76(*a, b*) which can display supplemental information related to items in the image display zone. FIG. 12A shows a detail of the display near attention zone 78. Although shown by shading lines in the drawing figures, zone 78 can use a conventional video highlighting method such as reverse video, an altered background color, or even (since the zone does not move) a pair of thin horizontal lines boundary lines drawn on the screen. Also as depicted in FIG. 12A, the auxiliary zones 76*a* and 76*b* are highlighted at the latitude of zone 78, in this case by boldfacing their contents.

The appearance and use of this second preferred embodiment differ from that of FIG. 8 in that the images in FIG. 12 scroll or move smoothly upwards within display zone 72, with the operator's gaze remaining in one zone of the screen. The flow charts of FIG. 13 will serve to clarify the operation of this second preferred embodiment.

Figure 13A:
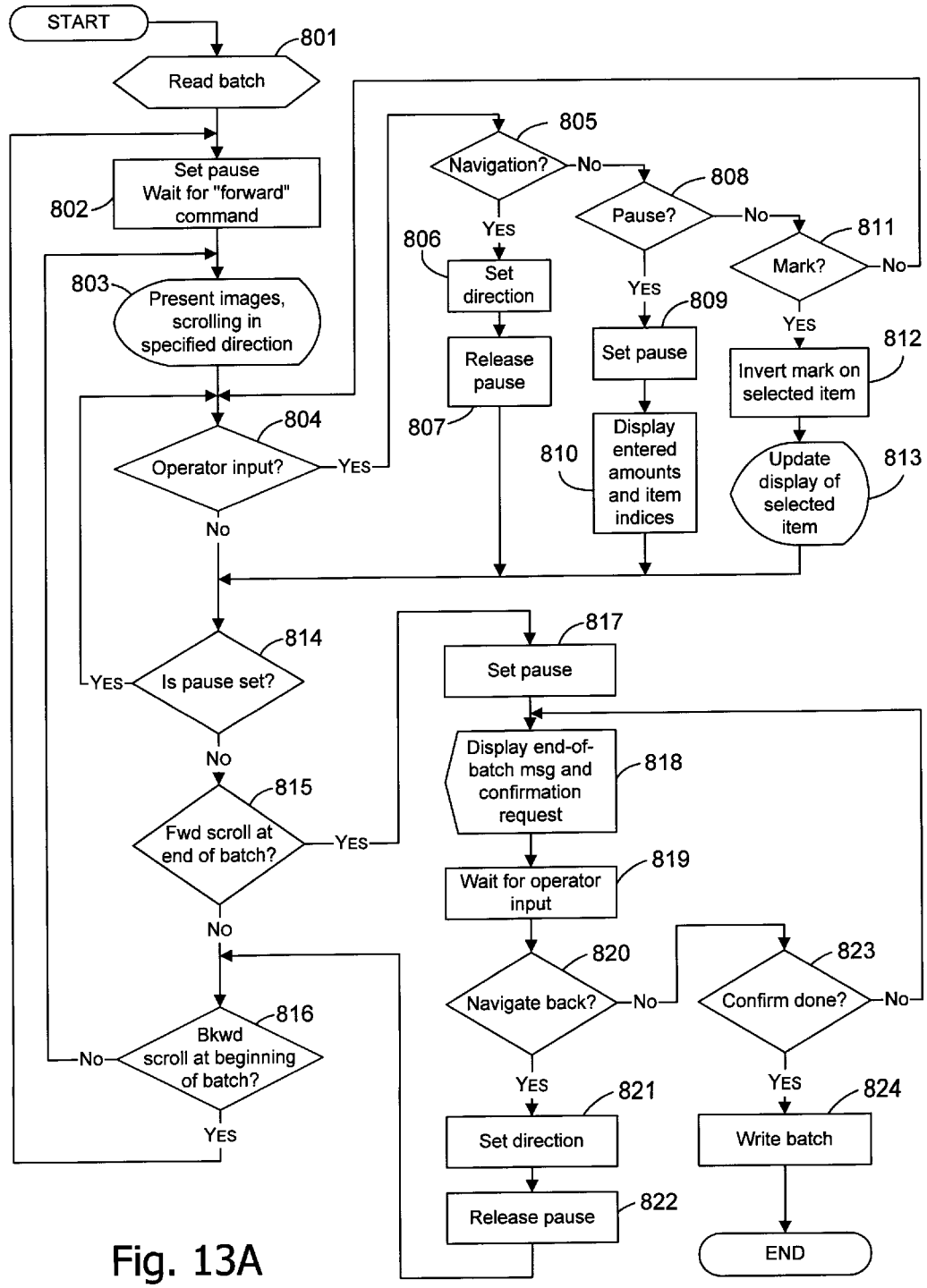
FIG. 13A is a flow chart for the control flow of the adjudication processor corresponding to FIG. 12.

We will consider first the operation of processor 80, diagrammed in FIG. 13A. The process begins with the reading of a batch of items in step 801. In step 802, the processor displays an initial prompt, e.g. "click FWD when ready", and then waits for the operator to indicate via a navigation command that forward scrolling should begin. Step 803 then proceeds to scroll images along the screen in the specified direction (which, at this point, is the forward or upward direction). While the images move, the processor tests in step 804 for operator input. The possible valid inputs are a navigation command, a pause command, or a mark command. The identification of the command type comprises steps 805, 808 and 811. If the input is none of those three valid types, execution returns to step 804 to await valid input. We will now consider each of the three valid inputs in turn.

First, suppose that the input is a navigation command, i.e. a command to move forward or backward within the batch. In step 806, the selected direction is simply registered by the processor. Step 807 then removes any pause command that may then be in effect, so that the display will be enabled to scroll in the selected direction.

Suppose alternatively that the input is a pause command. Execution then proceeds via step 809, which registers the pause command so that scrolling stops. A common reason for an operator to pause a scrolling display is to more carefully inspect its current contents due to having perceived some anomaly. Step 810 assists the inspection process by displaying additional information while the display is paused. For this purpose, step 810 uses auxiliary display areas 76 to the sides of the item images. To one side (which can be the right side zone 76*b*), step 810 shows the initial entered amount for the item. The other side (which can be the left side zone 76*a*) shows an index number, which can simply be an offset from the uppermost item of the display. Activating the auxiliary zones 76(*a,b*) in a "pop-up" fashion with the display paused provides the advantage of not distracting the operator by their contents until they are needed. Pop-up activation is also advantageous in reducing the computational burden on the display control logic, since the auxiliary fields need never be scrolled.

With the display now paused and the auxiliary information shown, the operator can easily determine whether the anomaly that led to the pause command is an ordering error in a displayed item. This leads to the third possible input type, namely a marking command. Execution in this case proceeds via step 812, which inverts the mark flag of the selected item. The item display is refreshed in step 813 to show the new mark status.

The control flow after each of the three possible command types leads to step 814. That step examines the pause state, which may have been changed by the input command. If the display is now paused, execution returns to step 804 to await new operator input. Otherwise, the display is scrolling, a process which will eventually lead to the end of the batch. Accordingly, step 815 tests for the combination of forward scrolling direction and end of batch. If this combination has not occurred, execution passes to step 816 which tests for the opposite condition, i.e., reverse scrolling at the beginning of batch. If this condition also is not occurring, normal operation continues via a return to step 803. Attempting to reverse-scroll beyond the beginning of the batch simply causes a return to step 802, so that the scrolling pauses and the processor waits for a command to scroll forward.

Now we consider the end-of-batch condition. Suppose that step 815 determines that the display has reached the end of the batch and that the scrolling direction is forward. No further progress through the batch is possible; all items have been presented for adjudication. Therefore, step 817 pauses the scrolling, and step 818 displays an alert message informing the operator of the end-of-batch condition and requesting operator confirmation. The operator's response is taken in step 819. As in the case of the first preferred embodiment, the operator is permitted to postpone confirmation so as to review previous work within the batch. This choice is tested in step 820 by testing whether the input is a "scroll back" navigation command. If so, the scrolling direction is set accordingly (step 821), the pause indication is removed (step 822), and the flow resumes at step 816. If the operator does not wish to review previous work, another valid choice is to confirm that adjudication of the batch is complete. If step 823 detects this confirmation, then the batch is written out in step 824. Otherwise, the input is invalid and execution returns to step 818 to re-display the prompt and await valid input.

Operator's Procedure for Second Preferred Embodiment (FIGS. 12, 13)

Figure 13B:
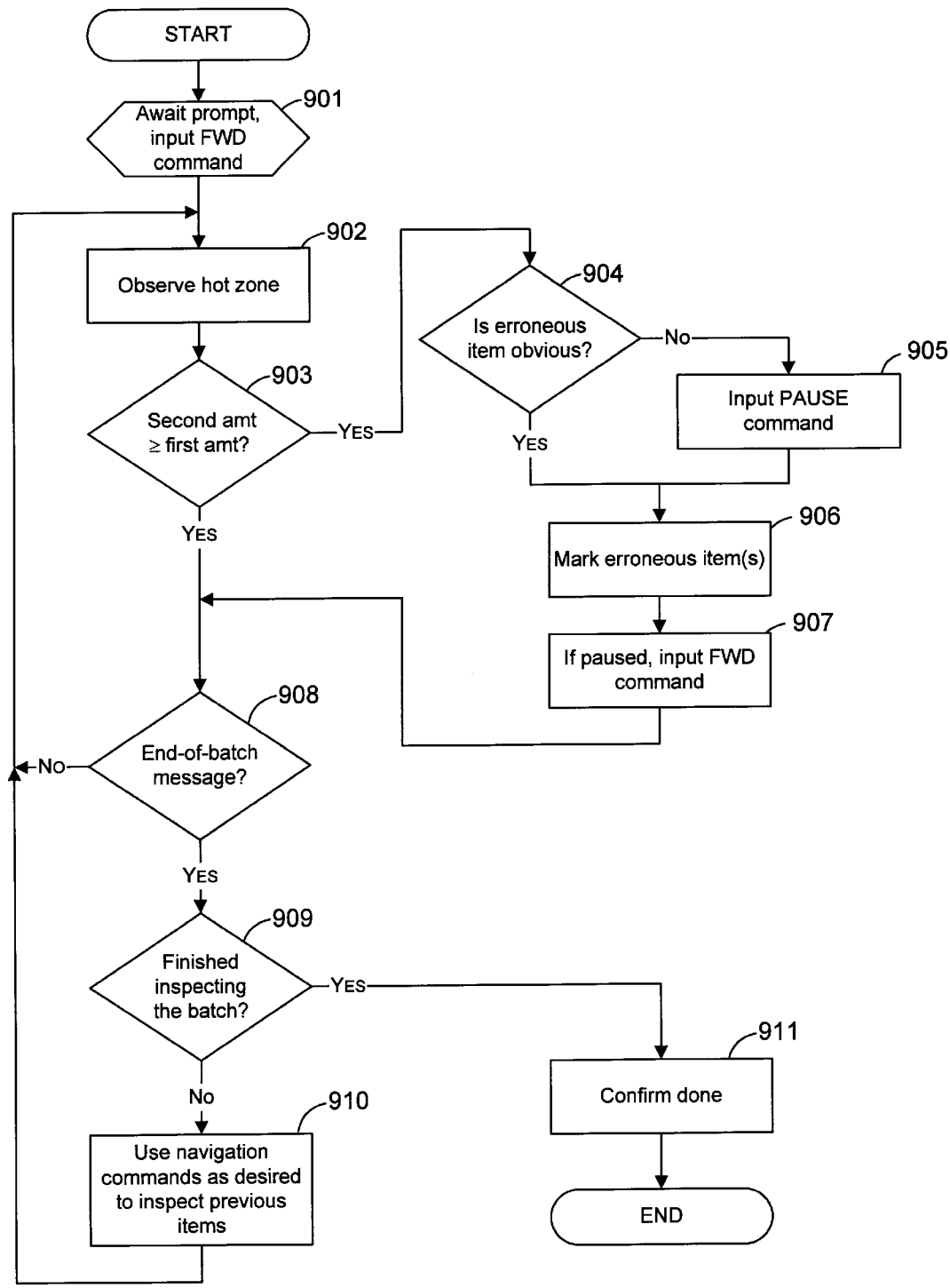
FIG. 13B is a flow chart for the actions of an operator of the adjudication station according to FIG. 12.

The adjudication operator of the adjudication station in FIG. 12 can follow the procedure shown in FIG. 13B. In step 901, the operator sees a prompt indicating that there is a batch ready for adjudication, and responds by selecting the "move forward" navigation command, so that item images begin appearing on the display. The operator then observes (step 902) the images scrolling through attention zone 78, and compares their numeric values (step 903). As long as the second (bottom) amount is at least as great as the first (top) amount, the batch is correctly ordered and no input is required; this condition corresponds to the path from step 903 to step 908. Suppose, however, that the operator detects a mis-ordering of the items in the attention zone. The operator now has the choice, in step 904, of pausing or not pausing the display. The item responsible for the mis-ordering may be sufficiently obvious that the operator can select and mark it immediately, in which case the next step is 906. An operator desiring more time or more information follows the path via step 905, giving a command to pause the scrolling. As noted in the description of FIG. 13A, steps 808–810, this command also activates the display of auxiliary information for each item image, including the initial entered amounts. The operator thus has abundant information to choose one or more items to mark in step 906. Then, in step 907, the operator gives a command to resume forward scrolling if it had been paused. Another variant would be to combine steps 906 and 907 via a shortcut use of the pointing device. For example, if clicking on an item image marks it, a double-click can both mark the item and resume forward scrolling.

At the end of a batch, the attention zone does not show any item images but instead shows an end-of-batch alert message. This condition is noticed by the operator in step 908 and a response is chosen in step 909 depending upon the operator's confidence in the inspection. As in the first preferred embodiment, the choices are to confirm batch completion (step 911) and await a new batch, or to use navigation commands (step 910) to review previously inspected items as desired.

Figure 14:
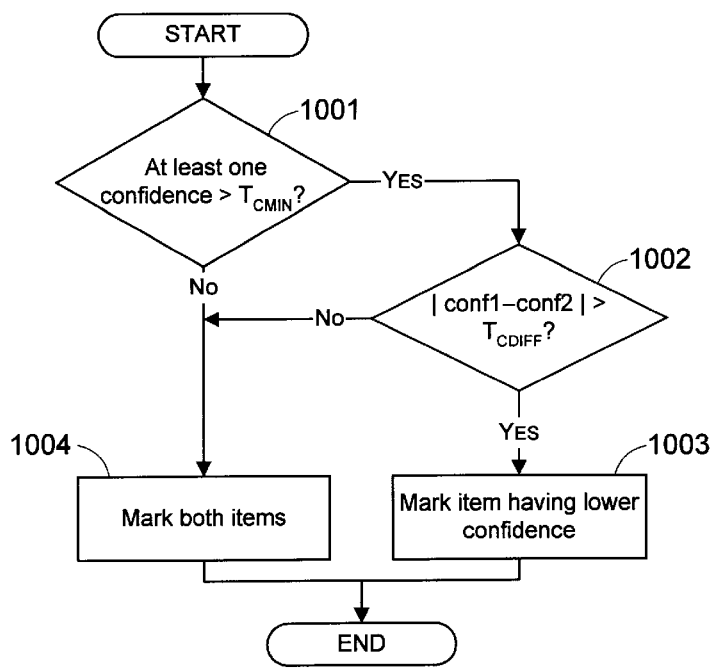
FIG. 14 is a flow chart of a method of choosing which item of a pair is more likely erroneous.
Figure 15:
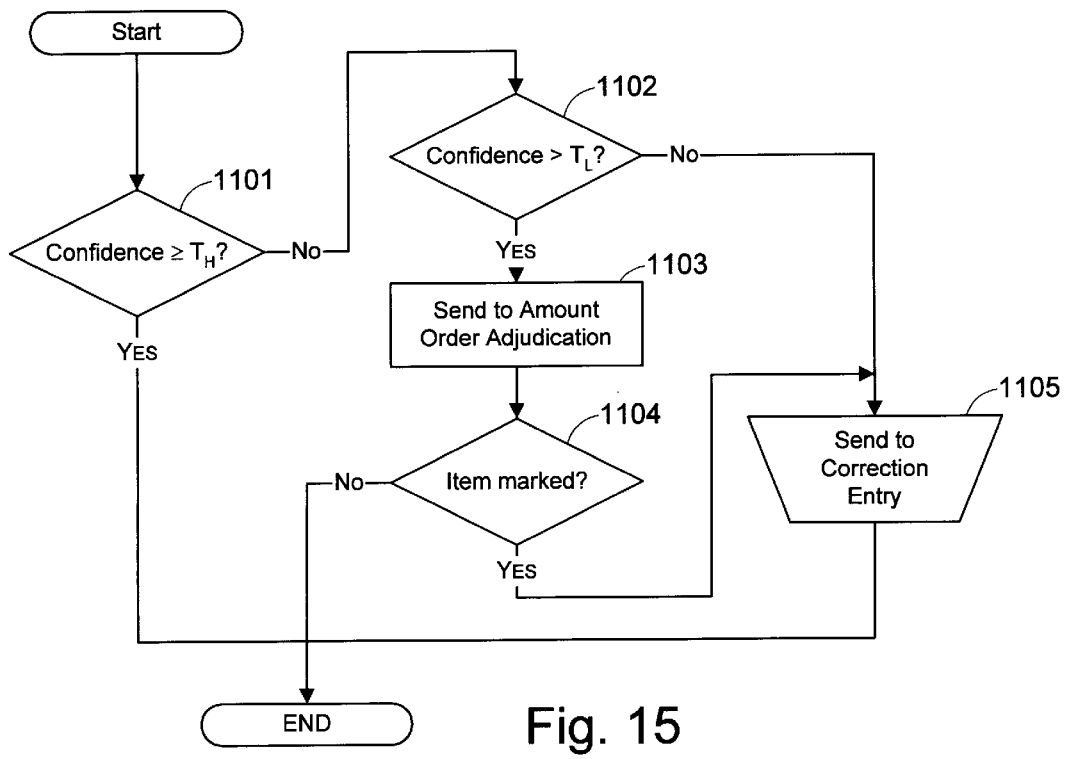
FIG. 15 is a flow chart of a method of using ICR confidence for triage prior to order adjudication.
Figure 16:
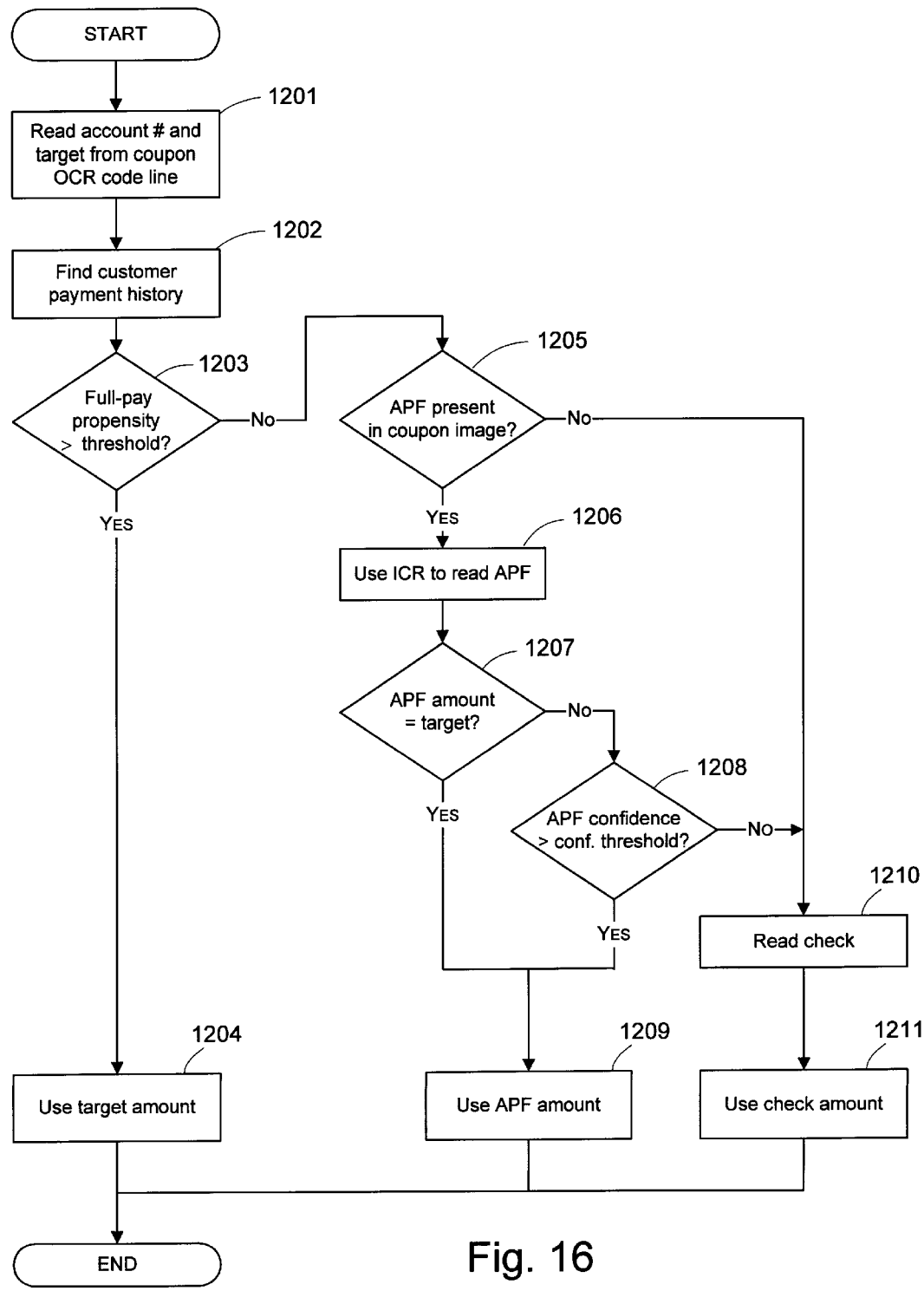
FIG. 16 is a flow chart of a means of avoiding initial entry when target values are available.

Additional Embodiments—FIGS. 14–16

The above embodiments illustrate that amount order adjudication according to this invention can provide an improved tradeoff of accuracy vs. labor, while avoiding several restrictions of previously known systems regarding the need for context or other information. For example, neither target amounts nor ICR confidences are required for effective use of the invention. However, in applications where such additional information is present, a system including amount order adjudication can use them to previously-unavailable advantage, as discussed below. Ergonomic benefits and other methods of integrating the invention into the system will also be considered.

Variants Using Confidence Values (FIGS. 14, 15)

Although the invention does not require that initial entry be performed by any particular means, if that stage includes ICR, then auxiliary confidence outputs commonly supplied by ICR recognizers may be used advantageously in conjunction with amount order adjudication. (Confidence may also be derived from other sources as discussed below, but for simplicity we will first assume that the confidence is an ICR confidence.) As one example, consider the case of a scrolling display according to FIG. 12, with a "hot zone" containing two amount images. The simplest possible error indication from the operator, e.g. a button click, indicates a mis-ordering of the two amounts but does not show which of the two is incorrect (or whether both are). FIG. 14 shows a way of completing the decision automatically. In the common case, the lower-confidence item of the pair is marked. If both amounts have confidence below some predetermined threshold, or if their recognition confidences fail to differ by some predetermined amount, then both would be marked for manual correction. The operator need therefore only indicate that there is a discrepancy in the hot zone, and need not specify an item.

The detailed procedure of FIG. 14 is as follows. The first test (step 1001) determines whether either item's confidence exceeds a predetermined minimum confidence threshold $T_{CMIN}$. If neither exceeds $T_{CMIN}$, then both items are marked for correction (step 1004). Otherwise, the difference between the two confidences is computed and tested in step 1002. If the difference exceeds a predetermined threshold $T_{CDIFF}$, then the higher-confidence item is deemed significantly more likely to be correct than the lower-confidence item. Accordingly, step 1003 is invoked and the lower-confidence item is marked. If the confidence difference fails to exceed $T_{CDIFF}$, the branch to step 1004 is taken, marking both items.

Further variants could apply additional sources of confidence information in choosing items for correction. For example, the ICR recognizer's relative propensity to delete or insert characters weights the likelihood in favor of the first or second item (respectively) of a mis-ordered pair. More generally, the confidence value need not originate with an ICR device at all, but can be a generalized transcription confidence representing the known statistics of whatever process created the initial entered value. Manually entered amounts, for example, can be assigned a confidence based on the measured accuracy of the data entry operators. Items belonging to a balancing group which is known to be in balance can be assigned an increased confidence relative to those from out-of-balance groups e confidence calculations can be made by the adjudication processor without in any way distracting the operator, who need still only consider the order of amounts in the attention zone.

ICR confidence or transcription confidence may also be used to select items to participate in adjudication. FIG. 15 shows a method of using confidence to perform triage prior to adjudication. Those recognition results with confidence above some predetermined upper threshold $T_H$ may be regarded as sufficiently reliable to be exempt from further validation. Conversely, results with confidence below some predetermined lower threshold $T_L$ are assumed to require manual correction and are sent directly to correction module 120 without passing through amount order adjudication. Those with confidences falling in the range $T_L \leq conf \leq T_H$ are sent to the adjudication station.

Specifically, the item's confidence is compared against $T_H$ in step 1101, and items exceeding that threshold receive no further inspection or correction. A second test in step 1102 compares against $T_L$, and items with confidence lower than $T_L$ are sent to correction entry directly. This may be done, for example, by setting item record's mark flag 20d to TRUE even while leaving the adjudication flag 20c as FALSE. Finally, those items passing both the 1101 and 1102 tests are sent to amount order adjudication in step 1103, following which the marked items (as determined by step 1104) are sent to correction entry (step 1105).

Figure 2A:
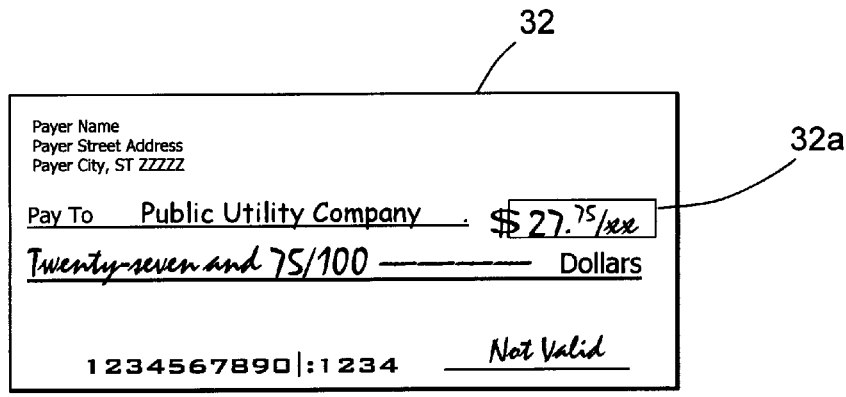
FIGS. 2A and 2B show financial document types (respectively a check and a remittance coupon) used in illustrating the preferred embodiment.
Figure 2B:
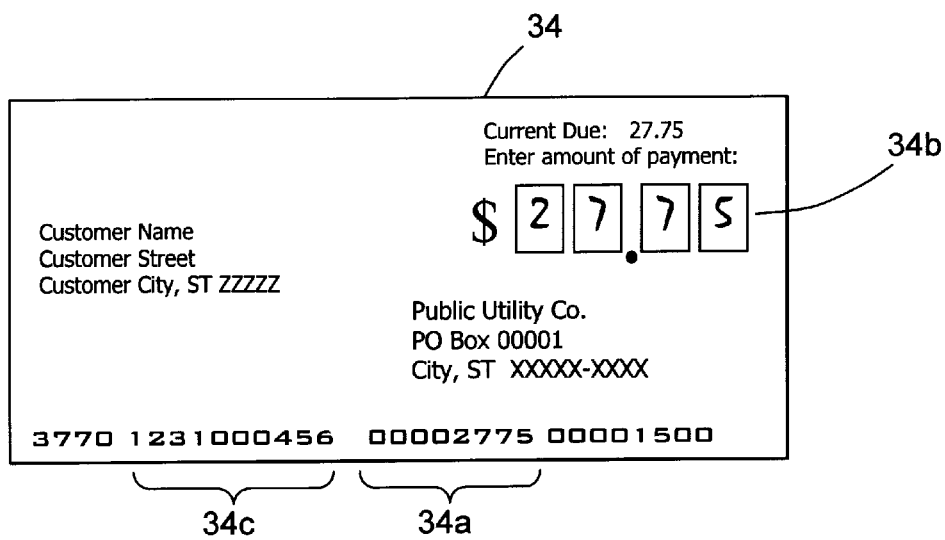

Variant to Reduce Initial Entry (FIGS. 2, 16)

Although the advantages of this invention have heretofore been stated primarily in terms of reduction of labor at the correction stage, the invention can in some applications reduce or eliminate the initial entry function. This is possible if a source of information regarding the amounts is available which, although not be sufficiently reliable in its own right to replace manual entry, may be sufficiently reliable when used in conjunction with this invention. For example, when a check is used in making a remittance payment, there are two auxiliary indications of the amount other than the check itself. Referring to FIG. 2(A,B), in a remittance application the check 32 is accompanied by a remittance coupon 34. A first auxiliary indication of the payment amount is the expected (target) payment amount 34a encoded on the OCR code line of coupon 34. Second, the remittance coupon commonly includes an amount-paid field (APF) 34b which, although handwritten, is designed to be automatically recognized more easily than a check. Each of these fields is strongly correlated with the check amount, but not so strongly correlated as to permit their use in place of the actual check in a conventional '780-type system. Nevertheless, depending upon the statistical properties of the application, use of such an auxiliary data source together with amount order adjudication can provide sufficient accuracy as to permit the initial entry module to entirely ignore the check.

In one possible embodiment, diagrammed in FIG. 16, a large fraction of checks may skip the initial entry stage follows: first, in step 1201, the OCR code line of the remittance coupon is examined for the customer's account number 34c. This account number is used in step 1202 to access a database containing information about that customer's payment history, and in particular, containing an indication of the customer's propensity to pay the full correct remittance amount. (Alternatively, the full-payment-propensity indicator may be directly encoded in the OCR line.) The full-pay propensity could be, for example, the number of consecutive past billing cycles in which the customer has paid the full amount. Step 1203 tests the indicated propensity. If it is high (with respect to a predetermined threshold value $T_{PAY}$), then in step 1204 the target amount 34a is accepted as the initial check amount, and is therefore the amount by which the check image will be ordered in the amount order adjudication stage. A low full-payment propensity leads to step 1205 where the presence of an APF is tested. (APF is an optional field, which in a typical application is used by about 80% of customers.) If the APF is present it is sent to automatic recognition in step 1206, producing both a recognized amount and an associated confidence. If the recognized APF amount equals the target amount 34a (step 1207), or if the APF confidence exceeds a predetermined threshold $T_{APF}$ (step 1208), then step 1209 accepts the APF value as the initial entered amount. Therefore in this branch of the chart, the APF value (which may or may not equal the target value 34a) will be the value by which the check is sorted for amount order adjudication. Failure of either the APF-present test in step 1205 or the confidence test in step 1208 will lead to step 1210, in which the check is read, and step 1211 in which the check courtesy amount value is accepted as the initial entered value. Steps 1210 and 1211 comprise the conventional initial entry operation in the absence of the target-finding rules 1201–1209. The check reading steps are entered only if the customer does not have a known tendency to pay the full amount, and the APF is either absent, or disagrees with the target amount and is read with low confidence. In a telephone company remittance application, the fraction of payments that match the full-pay amount is about 90% and the rate of APF utilization is about 80%.

Thus for a large number of payments, the relatively expensive operation of keying or recognizing the check may be advantageously eliminated at the initial entry stage. This is possible because the amount order adjudication step, which does involve inspection of actual check fields, increases the accuracy of the data entry system taken as a whole.

Each of the paths shown in FIG. 16 can result in the assignment of a transcription confidence to the result produced. This transcription confidence can be any suitable function of the known statistics of the application and (for the branches that involve ICR) the ICR confidence. Thus, the method shown in FIG. 16 can be used in conjunction with other methods disclosed above for using confidence to gain additional advantage from amount order adjudication.

Ergonomic Variants

The simplicity of input to the amount order adjudication station, advantageously requiring only a pointing device and not a full keyboard, permits a wider range of ergonomic choices than in a conventional computer workstation with keyboard. As one example, suppose that an operator wishes to use a fingertip or stylus to trace progress through the screenful of displayed amount images. Accordingly, video display 62 can be mounted in a horizontal or slanted work surface, such that a suitable viewing angle is achieved and the screen may be comfortably scanned by the operator's fingertip or hand-held stylus. The screen of video display 62 can be of a type responsive to the touch of a finger or stylus, so that no desk-mounted pointing device is required, the movement of the operator's hands is unrestricted, and the arms may be rested comfortably upon the uncluttered work surface.

Variants are also possible that entirely eliminate operator hand motion; for example, pointing device 64 can be a microphone. This arrangement is suitable for operators with severely impaired hand function, as well as in other cases where avoidance of repetitive hand motion is an objective.

Voice input is particularly advantageous in conjunction with a scrolling display as exemplified in FIGS. 12 and 13 and the automatic selection logic shown in FIG. 14. The possible command inputs are very few and can consist of the spoken words "forward", "backward", "mark", and "pause", which are easily and reliably distinguished by present-day voice recognition software. The operator procedure of FIG. 13B can then be modified as follows: steps 904 through 907 can be replaced by speaking the work "mark". The processor then applies the automatic selection procedure of steps 1001–1004 of FIG. 14. This results in automatic marking of the most likely erroneous item(s) in the attention zone, while scrolling continues. Alternatively, the system can be configured to allow the operator to specify the erroneous item. In that case, the spoken word "mark" causes a pause as in step 905 of FIG. 12B and (from the processor's viewpoint) step 809 of FIG. 12A. The auxiliary information appears in zones 76, and the operator speaks the index numbers (display zone 76a) of the items whose marks are to be inverted. The operator then speaks the command "forward" to resume scrolling.

A scrolling display can be provided with a detent function, whereby images scroll smoothly into a fixed position, resting there for a short time before scrolling to the next position. This appearance is broadly similar to the "hold in view" function of known mechanical document transports. The detent time can be a parameter specified by the operator using the pointing device. For example, if voice input is used as the pointing device, the operator can use the spoken words "faster" and "slower" to decrease or increase the detent time.

Although described above in the context of the scrolling display of FIGS. 12 and 13, voice input can also be used effectively with the two-dimensional display of FIG. 8. Row and column indices can in that case be provided along the edges of display zone 72, so that an operator can select or point to an amount image by speaking its row and column location. Alternatively, the indices can be placed adjacent to each amount image in zone 72, so that the operator can select an amount by reading aloud its associated index. The command word "mark" is not required in this embodiment because the action of specifying an item can invert its mark status immediately. The command word "pause" is also, of course, not required.

Ramification for Accuracy Monitoring

The effectiveness of the amount order adjudication station in identifying erroneous amounts can be approximately measured while the system is in operation, by the following means. A certain number of images with high-confidence amounts (e.g. manually entered, or corresponding to a target value, or with a high reported ICR confidence), can be deliberately inserted at incorrect positions within the amount-ordered list (as well as at their correct positions). The adjudication processor can then detect whether the amount order adjudication process successfully identifies the incorrect ordering. The frequency with which the adjudication station marks these incorrectly ordered items as requiring manual correction may be taken as an approximation for the rate at which it identifies actual errors. Further, this estimate may then be used, in conjunction with the overall frequency of amounts being sent to correction, to estimate the accuracy of the initial data entry process. Although broadly analogous to the known method of measuring ICR accuracy by sending a certain number of high-confidence ICR results to keyers, the above method is superior in that it entails no additional keying.

Variant to Use ICR Second Choice Results

If an amount marked during adjudication is an ICR result, and a second-choice ICR result is also available, then the system has an additional opportunity to avoid manual correction. If the second-choice amount is a larger amount than the one marked as erroneous, the item can be re-inserted into the list at the position corresponding to the second-choice amount, so that it will be presented to the operator subsequently in a different context. When the amount order adjudication process reaches this higher value, the item will be inspected again and either accepted, or marked finally for manual correction.

Occasionally in ICR systems providing second choices, the confidences for the first and second choice results may be similar and high, denoting an ambiguous result. The amount order adjudication process can be used to disambiguate these cases, as follows: the item is inserted twice into the amount-ordered list, at positions corresponding to the first and second choice amounts. If the operator indicates an error at exactly one position, the other position is assumed to reflect the correct amount. If the operator indicates an error at both positions or at neither position, the item is sent to manual correction.

Variant Combining Adjudication and Correction

While the preferred embodiment and several variants discussed above require no keyboard, a further variant can include a numeric keypad by which the operator, after selecting a mis-ordered amount image, can then enter a corrected amount for that image. The adjudication station and correction entry module would thus combine to form a proofreading station.

Summary, Ramifications, and Scope

Accordingly, the reader will appreciate that there are many respects in which amount order adjudication provides an improved system for efficiently detecting data entry errors in the processing of document images, including that:

It provides a method of correcting incorrect data entry results while eliminating the labor, required by prior art systems, of correcting results that are already correct.

It can efficiently detect errors in items devoid of inherent context or context from auxiliary sources.

It provides a unified interface for adjudicating data from mixed sources, including manual entry, ICR, or other sources.

It can separate correct from incorrect ICR results without using ICR confidence.

Nevertheless, it can use any of the auxiliary information commonly present in document processing systems, including ICR confidence, target values, related transaction documents, balancing information, and the like, and can use such information to produce a variety of additional advantages not provided by known systems.

Because of its overall effectiveness in improving the trade-off of accuracy vs. labor, it can operate in conjunction with known methods, and permits adjustment of the parameters of those methods to overcome their own tendencies to error.

It validates entire fields of results, including ICR results, without requiring segmentation of the fields into individual characters. Thus it avoids the effects of segmentation errors and is effective in detecting such errors.

It provides a method of verifying the correspondence between two representations of a data value by inspecting only one of those representations, thus reducing proofreading labor.

It reduces fatigue and enhances reliability by efficiently utilizing human perceptual abilities, in that attention need not be shifted, nor comparisons drawn, between two potentially very different representations of a data value.

It can even be used to eliminate labor in the initial data entry process, whereby for some items a correct value may be reached without ever having been explicitly entered from the item.

It significantly reduces exposure to repetitive-stress injuries, not only by eliminating key entry at the correction and/or initial entry stages, but also by providing adjudication apparatus using only a simple pointing device manipulated only occasionally. Moreover, the pointing device can be of any ergonomically advantageous type, even voice input.

Further, it will be immediately apparent to one skilled in the art that the system and method of the invention can be implemented by providing appropriate software instructions to any of a great variety of commonly available computers, or alternatively by using special purpose hardware, or by any reasonable combination of hardware and software.

Although the description above contains many specificities, these should not be construed as limiting the scope of the invention but as merely illustrating some of the presently preferred embodiments of the invention. Additional ramifications will be apparent to those skilled in the art. For example, the forward and backward navigation can use a scrollbar, which can be further enhanced by lines of contrasting color denoting the positions within the batch where items have been marked. Additionally, although shown in an exemplary mode including a correction entry module, the invention has the additional advantage of being effective in a mode wherein marked items can simply be discarded, as for example in the preparation of training data for adaptive recognizers.

Those skilled in the data processing art will discern that the invention provides a general method of comparing two sets of data values. The above description follows a common software design practice in representing the two values as fields within a single data structure. However, within the scope of the invention they can equally well be viewed as a first set of elements and a second, separate set of elements, whose individual elements correspond. If the values are derived from documents, the first and second values need not be derived from the same document. Indeed, the values need not be represented by images nor displayed on a video display at all, but can be other types of data among which an operator can discern an ordering or mis-ordering, such as the pitch of an audible tone. The invention is thus especially well suited to human perceptual capabilities, which are generally more effective at detecting differences than at measuring precise values, and which exhibit this effectiveness across several sensory and perceptual modalities. The skilled reader will accordingly discern yet further advantages, variants, ramifications and uses of the invention beyond those shown here.

Thus the scope of the invention should be determined, not by the above illustrative specification and examples, but rather by the appended claims and their legal equivalents.

I claim:

1. In an image-based system for processing documents, wherein said documents include written amounts, and wherein said system can include a captured image of each said document and a machine-readable candidate amount for each said written amount, and wherein said captured images depict at least said written amounts, an error detection method comprising:

(a) sorting said candidate amounts and said captured images into a sequacious order according to the values of said candidate amounts, (b) inspecting said captured images, said inspecting comprising inspecting the conformity of said written amounts to said sequacious order, and (c) identifying particular captured images depicting written amounts not conforming to said sequacious order, whereby error detection is provided without requiring the inspection of machine-readable candidate amounts, and without the additional labor of comparing two dissimilar representations.

2. The error detection method of claim 1, wherein said inspecting of said captured images includes presenting said images to an operator in an order visually indicative of the sorted order of said candidate amounts, and wherein said identifying of non-conforming amounts comprises accepting said operator's indication of images having amounts which appear not to conform to said visually indicated order.

3. The error detection method of claim 2, wherein said presenting of images comprises providing a video display, and wherein said visually indicative order disposes successive said images in at least one vertical column at successively lower positions upon said video display.

4. The error detection method of claim 1, further comprising transcribing amounts from said captured images to obtain said candidate amounts.

5. The error detection method of claim 4, wherein said transcribing of amounts from said documents includes providing a data entry terminal of known type for presenting said images to an operator and for accepting an input amount from said operator.

6. The error detection method of claim 4, wherein said transcribing of amounts from said documents includes providing a processor of known type for automatically reading said amounts from said images.

7. The error detection method of claim 1, further comprising obtaining said candidate amounts by reading amounts, statistically correlated with said written amounts, from related documents, said documents and said related documents possibly being different documents.

8. The error detection method of claim 1, further comprising:

(a) transcribing amounts from said captured images to obtain said candidate amounts, (b) providing a transcription confidence for each said transcribed candidate amount, (c) a method of selecting particular ones of said nonconforming images, said selecting method comprising:
  selecting a pair of adjacent images, said pair appearing not to conform to said sequacious order,
  comparing said transcription confidences of said nonconforming pair of images, and selecting from said nonconforming pair of images the particular image corresponding to the lower said transcription confidence.

9. A method for verifying the correspondence of a first set of values and a second set of values correlated with said first set, comprising:
(a) sorting said first and second sets of values into a sequacious order according to said values of said first set, and
(b) verifying that said values of said second set conform to said sequacious order.

10. The method of claim 9, wherein said verifying of said second set comprises the steps of:
(a) inspecting a plurality of values from said second set,
(b) determining whether said plurality of values conform to said sequacious order, and
(c) repeating steps (a) and (b) for additional values until all of said values of said second set have been inspected.

11. The method of claim 9, further comprising determining which particular values of said second set of values do not conform to said sequacious order.

12. The method of claim 11, further comprising:
(a) providing a confidence for each value of said second set of values, said confidence being indicative of the probability of equality of said value and the corresponding value of said first set of values,
(b) a method of selecting particular ones of said second set of values, said selecting method comprising:
selecting a plurality of adjacent values from said second set, said plurality of values failing to conform to said sequacious order,
comparing said confidences of said plurality of values, and
selecting from said plurality of values at least the value having the lowest said confidence.

13. In a data processing system, error detecting apparatus for detecting errors in a multitude of data items, wherein each said data item comprises a first value and a second value correlated to said first value, and wherein errors consist of inequalities between said first and second values, said apparatus comprising:
(a) sorting means for sorting said multitude of data items into a sequacious order according to said second values, and
(b) adjudication means for identifying particular data items which do not conform to said sequacious order according to said first values, whereby a system is provided which efficiently detects errors in transcription of one value to another, without requiring direct comparison of the two values.

14. The error detecting apparatus of claim 13, wherein said second values are numeric values and said sequacious order is a numeric order.

15. The error detecting apparatus of claim 13, further including:
(a) data capture means for obtaining said first value of each said data item, and
(b) transcription means for obtaining said second value for each said data item.

16. The error detecting apparatus of claim 13, wherein said data items represent written amounts.

17. The error detecting apparatus of claim 16, wherein said written amounts are written upon financial transaction documents.

18. The error detecting apparatus of claim 13, wherein said adjudication means comprises:
(a) display means for displaying said first values to an operator, and
(b) marking means for accepting an indication from said operator of nonconforming data items.

19. The error detecting apparatus of claim 18, wherein said display means includes a video display and wherein said marking means comprises:
(a) a pointing device,
(b) a processor responsive to said pointing device, and
(c) a variable value associated with said nonconforming data item, said processor being enabled to alter the value of said variable value.

20. The error detecting apparatus of claim 18, wherein said display means includes a video display and wherein said adjudication means further includes:
(a) organizing means for presenting said first values successively in at least one vertical column,
(b) navigation means for accepting and executing a command from said operator to display from selected portions of said multitude of data items,
(c) control means to accept a command from said operator to display auxiliary information associated with said displayed data items, and
(d) means, responsive to said control means, for displaying said auxiliary information.

21. The error detecting apparatus of claim 20, wherein said auxiliary information includes said second values.

* * * * *